United States Patent
Gormley

(10) Patent No.: US 9,824,383 B2
(45) Date of Patent: Nov. 21, 2017

(54) VEHICLE CUSTOMIZATION AND PERSONALIZATION ACTIVITIES

(71) Applicant: Joseph Gormley, Livonia, MI (US)

(72) Inventor: Joseph Gormley, Livonia, MI (US)

(73) Assignee: Joseph Gormley, Livonis, MI (US), as Trustee under the Joseph Gormley Trust Dated August 16, 2010

(*) Notice: Subject to any disclaimer, the term of this patent is extended or adjusted under 35 U.S.C. 154(b) by 335 days.

(21) Appl. No.: 14/582,380

(22) Filed: Dec. 24, 2014

(65) Prior Publication Data

US 2015/0142264 A1   May 21, 2015

Related U.S. Application Data

(63) Continuation of application No. 14/203,619, filed on Mar. 11, 2014, which is a continuation of application
(Continued)

(51) Int. Cl.
| | | |
|---|---|---|
| G06Q 30/06 | (2012.01) | |
| B60R 16/037 | (2006.01) | |
| G07C 5/00 | (2006.01) | |

(52) U.S. Cl.
CPC ..... *G06Q 30/0621* (2013.01); *B60R 16/0373* (2013.01); *G07C 5/008* (2013.01)

(58) Field of Classification Search
CPC . G06Q 30/0621; G07C 5/008; B60R 16/0373
See application file for complete search history.

(56) References Cited

U.S. PATENT DOCUMENTS

| | | |
|---|---|---|
| 4,908,792 A | 3/1990 | Przbyla et al. |
| 5,477,827 A | 12/1995 | Weisman, II et al. |
| | (Continued) | |

FOREIGN PATENT DOCUMENTS

| | | |
|---|---|---|
| EP | 0801351 A2 | 10/1997 |
| EP | 1186477 A3 | 3/2004 |

OTHER PUBLICATIONS

Antonucci, A.; Office Action for U.S. Appl. No. 14/203,619; United States Patent and Trademark Office; Alexandria, VA; dated Feb. 3, 2017.
(Continued)

*Primary Examiner* — Anne M Antonucci
(74) *Attorney, Agent, or Firm* — Thomas E. Lees, LLC

(57) ABSTRACT

Information is provided to a vehicle by receiving, from a data center, a set of travel related services that are specific to an individual, where the travel related services are received into a control and interconnection system of a vehicle. The control and interconnection system comprises a vehicle interface that interfaces with vehicle subsystems, an operator interface that interfaces with an operator of the vehicle, and a system controller that communicates with vehicle subsystems. The method includes loading the set of travel related services into the system controller of the control and interconnection system, utilizing the control and interconnection system to monitor operational characteristics of the vehicle based upon the loaded set of travel related services, and communicating operational characteristics to the data center. In response, personalized information is received from the data center, whereby the control and interconnection system performs an operation in response to receiving the personalized information.

24 Claims, 12 Drawing Sheets

Related U.S. Application Data

No. 11/956,073, filed on Dec. 13, 2007, now Pat. No. 8,694,328.

(60) Provisional application No. 60/869,922, filed on Dec. 14, 2006.

(56) References Cited

U.S. PATENT DOCUMENTS

| | | |
|---|---|---|
| 5,513,107 A | 4/1996 | Gormley |
| 5,530,360 A | 6/1996 | Kerchaert et al. |
| 5,680,328 A | 10/1997 | Skorupski et al. |
| 5,794,164 A | 8/1998 | Beckert et al. |
| 5,850,209 A | 12/1998 | Lemke et al. |
| 5,857,158 A | 1/1999 | Zimmermann et al. |
| 5,884,202 A | 3/1999 | Arjomand |
| 5,890,086 A | 3/1999 | Wellman et al. |
| 5,892,942 A | 4/1999 | Ohnishi et al. |
| 5,916,287 A | 6/1999 | Arjomand et al. |
| 6,009,363 A | 12/1999 | Beckert et al. |
| 6,052,634 A | 4/2000 | Pathe et al. |
| 6,150,925 A | 11/2000 | Casazza |
| 6,175,789 B1 | 1/2001 | Beckert et al. |
| 6,181,996 B1 | 1/2001 | Chou et al. |
| 6,185,491 B1 | 2/2001 | Gray et al. |
| 6,198,996 B1 | 3/2001 | Berstis |
| 6,202,008 B1 | 3/2001 | Beckert et al. |
| 6,240,347 B1 | 5/2001 | Everhart et al. |
| 6,253,122 B1 | 6/2001 | Razavi et al. |
| 6,270,350 B1 | 8/2001 | Christopher |
| 6,362,730 B2 | 3/2002 | Razavi et al. |
| 6,370,449 B1 | 4/2002 | Razavi et al. |
| 6,407,554 B1 | 6/2002 | Godau et al. |
| 6,430,488 B1 | 8/2002 | Goldman et al. |
| 6,438,737 B1 | 8/2002 | Morelli et al. |
| 6,654,669 B2 | 11/2003 | Eisenmann et al. |
| 6,728,603 B2 | 4/2004 | Pruzan et al. |
| 6,757,600 B2 | 6/2004 | Bachle |
| 6,812,942 B2 | 11/2004 | Ribak |
| 6,831,375 B1 | 12/2004 | Currie et al. |
| 7,590,768 B2 | 9/2009 | Gormley |
| 7,596,636 B2 | 9/2009 | Gormley |
| 2001/0001319 A1 | 5/2001 | Beckert et al. |
| 2001/0012976 A1 | 8/2001 | Menig et al. |
| 2002/0004694 A1 | 1/2002 | McLeod et al. |
| 2002/0111715 A1 | 8/2002 | Richard |
| 2002/0125998 A1 | 9/2002 | Petite et al. |
| 2002/0161664 A1 | 10/2002 | Shaya et al. |
| 2002/0188479 A1 | 12/2002 | Renwick et al. |
| 2002/0193925 A1 | 12/2002 | Funkhouser et al. |
| 2003/0046179 A1 | 3/2003 | Anabtawi et al. |
| 2003/0078709 A1 | 4/2003 | Yester et al. |
| 2003/0163298 A1 | 8/2003 | Odom et al. |
| 2003/0231550 A1 | 12/2003 | Macfarlane |
| 2004/0044454 A1 | 3/2004 | Ross et al. |
| 2004/0122574 A1 | 6/2004 | Inman et al. |
| 2004/0148069 A1 | 7/2004 | Marshall et al. |
| 2004/0153356 A1 | 8/2004 | Lockwood et al. |
| 2004/0170070 A1 | 9/2004 | Rapp et al. |
| 2004/0225415 A1 | 11/2004 | Newberry |
| 2004/0230358 A1 | 11/2004 | Stam et al. |
| 2005/0004726 A1 | 1/2005 | Paquet |
| 2005/0065684 A1 | 3/2005 | Larson et al. |
| 2005/0177252 A1 | 8/2005 | Chernoff et al. |
| 2007/0032913 A1 | 2/2007 | Ghoneim et al. |
| 2008/0120175 A1 | 5/2008 | Doering |

OTHER PUBLICATIONS

Karen Parnell; Automotive Reconfigurable Platforms—Creating the Dream; ECN Magazine; Jul. 1, 2004; www.reed-electronics.com/ecnmag.

A. Winter, D. Bittruf, Y. Tanurhan, K.D. Muller-Glaser; Abstract of Rapid Prototyping of a Communication Controller for the CAN bus, 7th IEEE International Workshop on Rapid System Prototyping (RSP '96); Thessaloniki, Greece; IEEE, Inc.; Jun. 19, 1996.

Karen Parnell; Put the Right Bus in Your Car, The Amazing Array of Features Available in Today's Cars Has Spawned New in-Vehicle Bus Standards; AMI Semiconductor; Xcell Journal Online; Xilinx, Inc.; Winter 2004.

M. Weerwein, et al.; Embedded Systems Verification with FGPA-Enhanced In-Circuit Emulator; de.bosch.com; 2000.

Automotive Open System Architecture Development Partnership Information Pack; AUTOSAR; Jan. 21, 2003.

Semiconductor Solutions for the European Automotive Industry; Automotive Specifics; AMI Semiconductor; Issue 1; pp. 1-8; 2003.

Robert Green, Karen Parnell; FPGAs are the Brains Behind "Smart" Cars; Xcell Journal; Summer 2003.

Karen Parnell; Telematics Drives the New Automotive Business Model; Xcell Journal; Fall 2002.

Karen Parnell; You Can Take it With You: On the Road with Xilinx; Xcell Journal; Summer 2002.

Programmable Solutions for Automotive Applications; Xilinx; 2004; USA.

Karen Parnell; Reconfigurable Vehicles Are Just Around the Corner; Xcell Journal; Fall/Winter 2001.

Rapid Chip Platform ASICs vs FPGAs, Get Lower Cost, Higher Design Efficiency, and Faster Time to Revenue; LSI Logic Corporation; Mar. 2005.

Karen Parnell; Could Microprocessor Obsolescence Be History?; Xcell Journal; Spring 2003.

Xilinx Automotive (XA) Programmable Logic Solutions; 2005.

Joseph Gormley, "Trends in Vehicle Personalizing", SAE International, Oct. 20, 1986.

"CarChip" (www.carchip.com, Wayback Machine Internet Archive web page dated Jan. 2006, <http://web.archive.org/web/20060112011717/http://www.davisnet.com/drive/products/carchip_products.asp>, accessed May 16, 2003).

Antonucci, A.; Office Action for U.S. Appl. No. 14/582,414; United States Patent and Trademark Office; Alexandria, VA; notification dated Feb. 22, 2017.

VEHICLE CUSTOMIZATION AND PERSONALIZATION ACTIVITIES

CROSS-REFERENCE TO RELATED APPLICATIONS

This application is a continuation of U.S. patent application Ser. No. 14/203,619, filed Mar. 11, 2014, now pending, which is a continuation of U.S. patent application Ser. No. 11/956,073, filed Dec. 13, 2007, now issued as U.S. Pat. No. 8,694,328, which claims the benefit of U.S. Provisional Patent Application Ser. No. 60/869,922 filed Dec. 14, 2006, entitled "VEHICLE CUSTOMIZATION AND PERSONALIZATION ACTIVITIES", the disclosures of which are hereby incorporated by reference.

BACKGROUND OF THE INVENTION

The present invention relates in general to systems and methods for providing customized and/or personalized vehicle pre-acquisition activities. The present invention further relates in general to vehicle post-acquisition activities, including for example, vehicle customization and personalization and/or providing vehicle-related services.

Vehicle purchasing decisions can be difficult, time consuming and confusing for many individuals due to the increasingly large number of vehicle makes and models available in the new and used vehicle markets. Often times, such vehicle purchasing decisions are further complicated because many individuals find themselves having limited resources to devote to vehicle acquisition decisions. For example, a vehicle purchaser may have limited time to make a purchasing decision. As another example, a vehicle purchaser may have limited vehicle knowledge and/or a limited understanding of the new and used vehicle markets, financing requirements, etc. Still further, a vehicle purchaser may have limited access to research tools that may be necessary to make an informed vehicle purchasing decision.

As such, it is possible that a vehicle owner or operator has settled for a vehicle that does not provide a desired or expected number of features, level of performance or quality of service. Additionally, when selecting a vehicle, it is possible that compromises may be required because a desired vehicle may not be provided with all of the features or capabilities that are sought by a vehicle owner or operator. Accordingly, sub-optimal driving experiences may result.

BRIEF SUMMARY OF THE INVENTION

According to aspects of the present disclosure, a method of providing information to a vehicle, comprises receiving, from a data center, a set of travel related services that are specific to an individual, where the set of travel related services are received into a control and interconnection system associated with a vehicle. Here, the control and interconnection system includes a vehicle interface that interfaces with vehicle subsystems, an operator interface that interfaces with an operator of the vehicle, and a system controller that communicates with vehicle subsystems using the vehicle interface, and which interacts with the operator using the operator interface.

The method also comprises loading the set of travel related services into the system controller of the control and interconnection system of the vehicle operated by the individual, and utilizing the control and interconnection system to monitor operational characteristics of the vehicle based upon the loaded set of travel related services. The method further comprises communicating the operational characteristics of the vehicle extracted by the control and interconnection system to the data center, and receiving personalized information from the data center in response to receiving the operational characteristics. The method still further comprises performing an operation in the vehicle by the control and interconnection system, in response to receiving the personalized information.

BRIEF DESCRIPTION OF THE SEVERAL VIEWS OF THE DRAWINGS

The following description of embodiments of the present invention can be best understood when read in conjunction with the following drawings, where like structure is indicated with like reference numerals, and in which.

DETAILED DESCRIPTION OF THE INVENTION

In the following description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
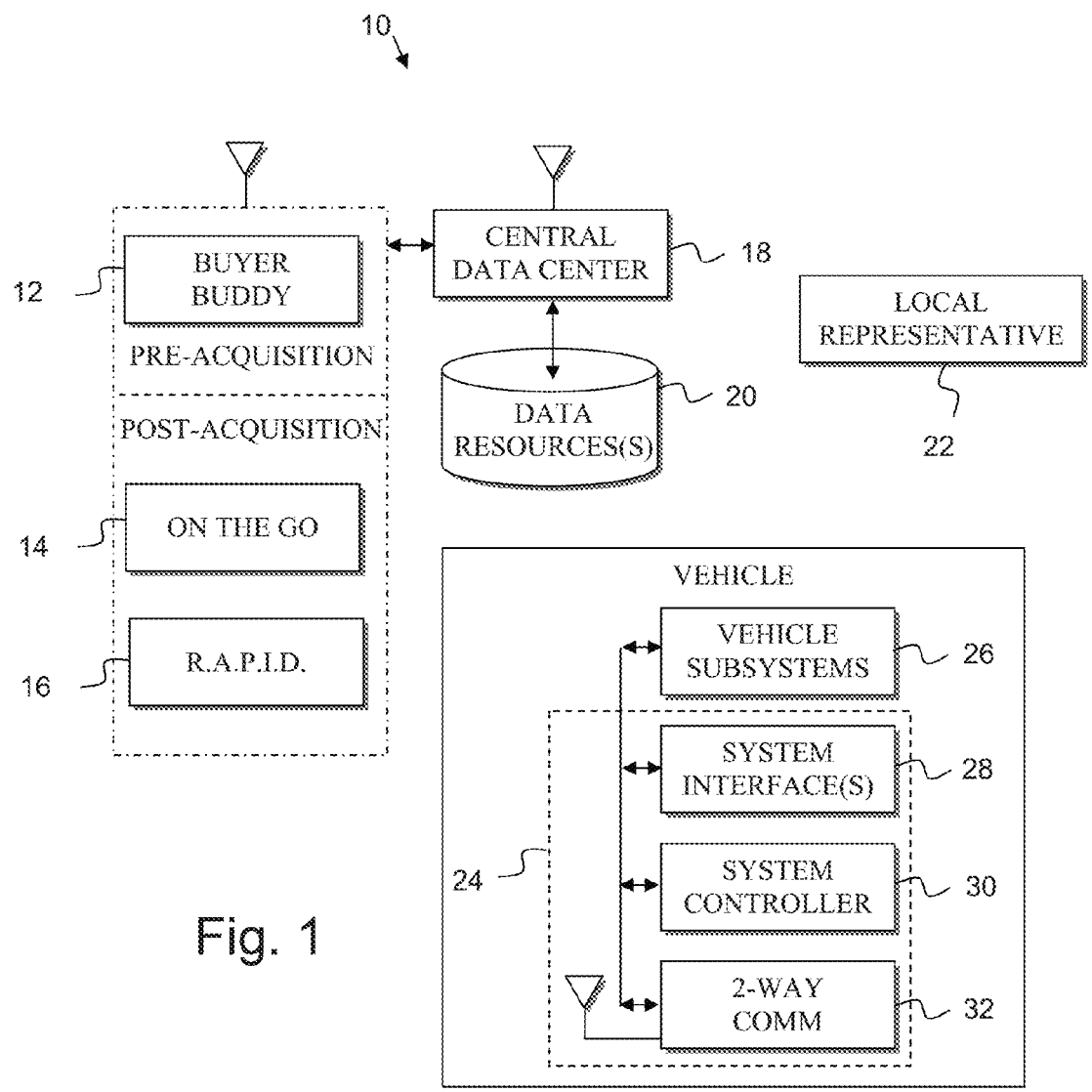
FIG. 1 is a block diagram of various components of a Digi-Drive enterprise according to various aspects of the present invention.

Referring now to the drawings, and particularly to FIG. 1, systems and methods are provided for leveraging vehicle knowledge and know-how as well as collected vehicle information into a client-centric enterprise 10 that provides customized and/or personalized vehicle related products, services and/or capabilities. For example, an enterprise 10 includes a pre-acquisition component referred to generally as Buyer Buddy 12, and post acquisition components including On-The-Go 14 and real-time anticipation program for interactive diagnostics (R.A.P.I.D.) 16. Implementations of various aspects of the present invention that may be related to vehicle pre-acquisition activities and/or vehicle post-acquisition activities are referred to generally in the specification as "Digi-Drive".

Various aspects of a Digi-Drive enterprise 10 may communicate with a data center 18, e.g., via wired or wireless transmission, such as across the Internet. The data center 18 supports one or more data resources 20 to assist in facilitating various aspects of the present invention. Also, in the specification, reference is made to a Digi-Drive representative 22 that serves as a technical analyst. In practice, the Digi-Drive representative 22 may be a human and/or machine expert that is utilized to implement, supplement or otherwise provide technical assistance to various aspects of the present invention. For example, the Digi-Drive representative 22 may be utilized to either implement or assist in performing functions of the Buyer Buddy 12, such as by performing technical analysis and other complimentary activities. Still further, the Digi-Drive representative 22 may provide vehicle post acquisition technical assistance, such as in assisting with selecting and/or implementing technical features and/or post acquisition services. The Buyer Buddy 12, On-The-Go 14, R.A.P.I.D. 16 and the representative 22 are described in greater detail herein.

Various aspects of a Digi-Drive enterprise 10 may also operate in conjunction with, or otherwise interact with, a Digi-Drive control and interconnection system 24. For example, the control and interconnection system 24 may comprise any of the various implementations of the technology described in greater detail herein, and as described in U.S. Pat. No. 7,590,768, titled, "CONTROL AND INTERCONNECTION SYSTEM" and/or U.S. Pat. No. 7,596,636, titled, "SYSTEMS AND METHODS FOR IMPLEMENTING A VEHICLE CONTROL AND INTERCONNECTION SYSTEM", which are hereby incorporated by reference.

As described in the incorporated references, the hardware and software comprising a corresponding control and interconnection system 24 provides a vehicle interface to the Digi-drive enterprise 10, such as for the integration of the various products and services of the particular Digi-Drive implementation. For example, a control and interconnection system 24 installed in a vehicle may include hardware that interacts with or otherwise implements vehicle subsystems 26. The control and interconnection system 24 may also implement one or more interfaces 28 and may provide a system controller 30 as described in greater detail herein.

Moreover, one or more of the control and interconnection system components may communicate with the various components of a Digi-Drive enterprise 10 via a two way communications link 32. For example, the data center 18 may serve as a remote computer system, e.g., a hub for servicing clients that have vehicles equipped with a control and interconnection system 24. The data center 18 may also serve as a communications center, a data center, data warehouse, central data store, data repository or data processing center for each of the Digi-Drive components. In this regard, the data center 18 may, in practice, be maintained in a single physical location, or the data center 18 may be physically distributed across multiple geographic locations. The vehicle operator may also interact with various aspects of the Digi-Drive system via the Digi-Drive representative 22 and/or via other interaction with the data center 18, e.g., via telephone contact, communication via a personal computer, etc.

In general, the post acquisition services, such as On-The-Go 14 and R.A.P.I.D. 16 integrate with and/or enhance the capabilities of a vehicle-installed Digi-Drive control and interconnection systems 24. The Buyer Buddy 14 provides vehicle pre-acquisition services, and thus may operate independently of any of the other Digi-Drive components. However, the Buyer Buddy 14 may also serve as an initiation to providing a vehicle with a corresponding control and interconnection system 24, and may further leverage the vehicle knowledge acquired and maintained by the post acquisition services to provide its pre-acquisition services to new users as will be described in greater detail herein. Moreover, a specific implementation of the Digi-Drive enterprise 10 need not require each of the Buyer Buddy 12, On-The-Go 14, R.A.P.I.D. 16 and the control and interconnection system 24. Rather, an implementation may comprise only select components or aspects thereof. Still further, the Buyer Buddy 12, On-The-Go 14 and R.A.P.I.D. 16 and/or control and interconnection system 24 are described with reference to multiple functionalities for purposes of illustration. However, a specific implementation may require all of the functionalities described herein.

The Buyer Buddy

The Buyer Buddy 12 interacts with the central data center 18 to integrate vehicle data and personal data to provide a customized and personalized vehicle experience. For example, the Buyer Buddy 12 may be utilized to perform evaluations and analysis to assist individuals in vehicle education, inspection, selection, negotiation and activities related to vehicle acquisition including purchase, lease, rental or other arrangements for controlling and/or operating a corresponding vehicle. Moreover, where appropriate, the Buyer Buddy 12 can assist the client in selecting customized options and personalized features that are implemented by a control and interconnection system 24 that may be installed in the acquired vehicle as described in greater detail herein.

Figure 2:
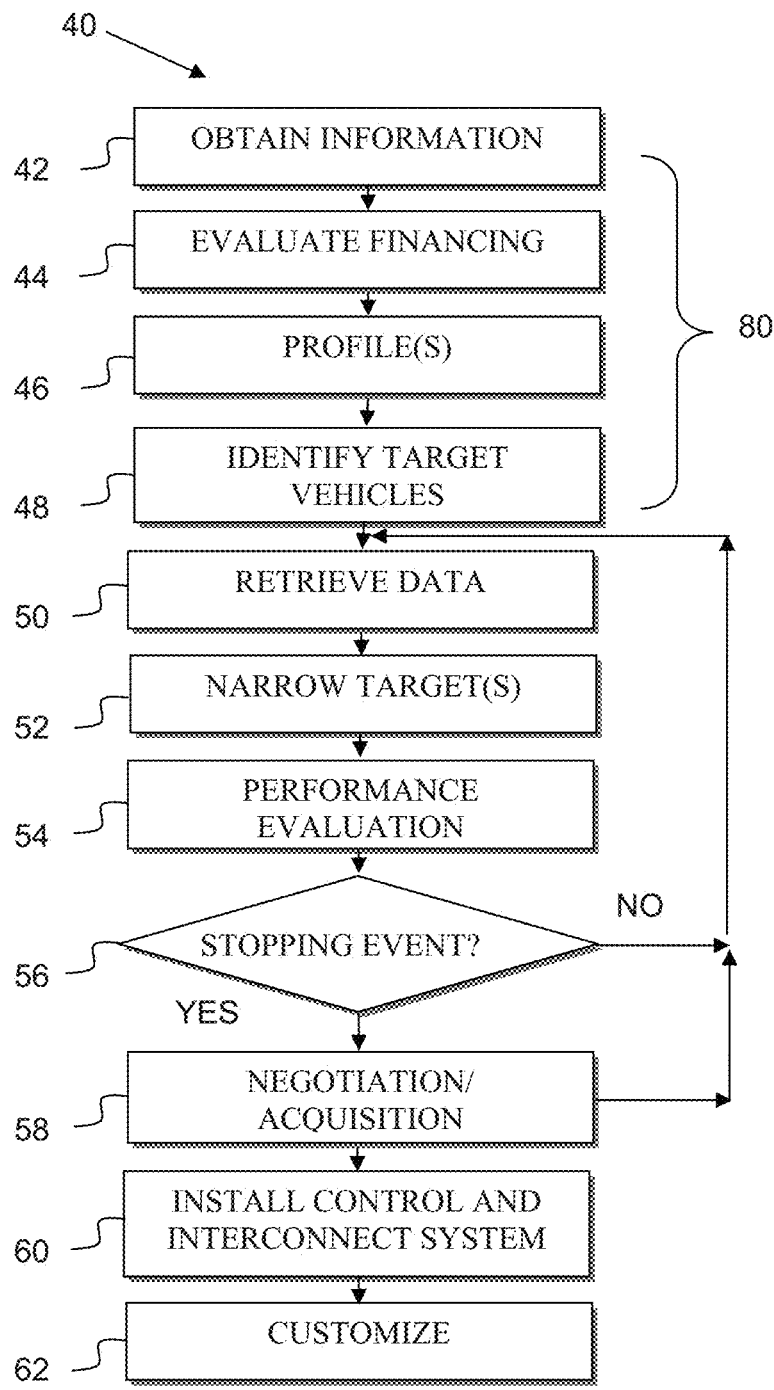
FIG. 2 is a flow chart of a method of providing vehicle acquisition assistance according to various aspects of the present invention.

Referring to FIG. 2, a method 40 illustrates an approach for providing vehicle acquisition assistance utilizing the Buyer Buddy 12 according to various aspects of the present invention. Initial information is obtained from an individual, such as a buddy buyer client at 42. The obtained information will typically include financial information, vehicle preference information and personal information, but other/alternative information may be obtained as well. The obtained information is stored, such as in a database or other appropriate manner. After obtaining sufficient information, a preliminary budget is evaluated at 44. For example, financing qualifications may be evaluated for the individual based at least in part upon the obtained financial information. The evaluation of a preliminary budget may comprise actually pre-approval of financing from a lender or evaluating potential spending limits based upon information obtained from the individual.

One or more profiles are generated at 46 based at least in part, upon the obtained information. For example, an individual profile may be derived from the preference and/or personal information obtained from the individual. The individual profile is used to classify or characterize the individual, identify features, characteristics, requirements for vehicle acquisition, etc. A list of suitable target vehicles is generated at 48. The list of target vehicles may be based at least in part, upon the evaluated preliminary budget, the obtained information from the individual, the generated profile(s) of the individual, research conducted to retrieve vehicle data including vehicle features from one or more databases and/or other sources. For example, vehicle requirements may be determined from simulation results and/or other information. The vehicle requirements may be used to identify target vehicles satisfying the determined vehicle requirements. Target vehicles may be identified that actually satisfy the vehicle requirements or that are modifiable using available after-market peripheral devices to meet the vehicles requirements, e.g., by installing a control and interconnection system as will be described more fully herein.

For example, at least one simulation may be performed to derive at least one individual characteristic of the individual, e.g., by recording a measurement of a physical characteristic of the individual or recording a measurement of a human performance characteristic of the individual. Under this arrangement, vehicle requirements may be determined from the simulation results and the obtained information by considering the recorded measurements in context with vehicle and machine capabilities.

An iterative approach may then be utilized by repeating a selection process until a stopping event is detected, e.g., a select target vehicle meets certain identified approval criteria. Vehicle data is retrieved at 50, e.g., from at least one database, for selected target vehicles, and the field of target vehicles is narrowed at 52 to a list of candidate vehicles, e.g., based upon the obtained information from the individual, the generated profile(s), the retrieved vehicle data and/or the preliminary budget for vehicle acquisition. An evaluation is performed at 54 of at least one candidate vehicle and a decision is made at 56 as to whether a stopping event has been satisfied. For example, each evaluated candidate vehicle may be assigned an acceptance rating. If the acceptance rating of one or more evaluated vehicles satisfies the established approval criteria, then a vehicle acquisition recommendation may be conveyed to the individual, e.g., based upon a ranking of the evaluated candidate vehicles. If no stopping event is detected, e.g., where no vehicle satisfies the approval criteria of the individual, the process can loop back to any previous process, (shown looping back to retrieve additional data for purposes of illustration).

If a vehicle satisfies the approval criteria, then it may be selected for acquisition from the evaluated vehicle types. Negotiation is performed at 58 for the acquisition of the selected vehicle. Upon obtaining possession of the acquired vehicle, a control and interconnect system may be installed at 60 and customization may performed at 62, e.g., based upon the individual's preferences.

Figure 3:
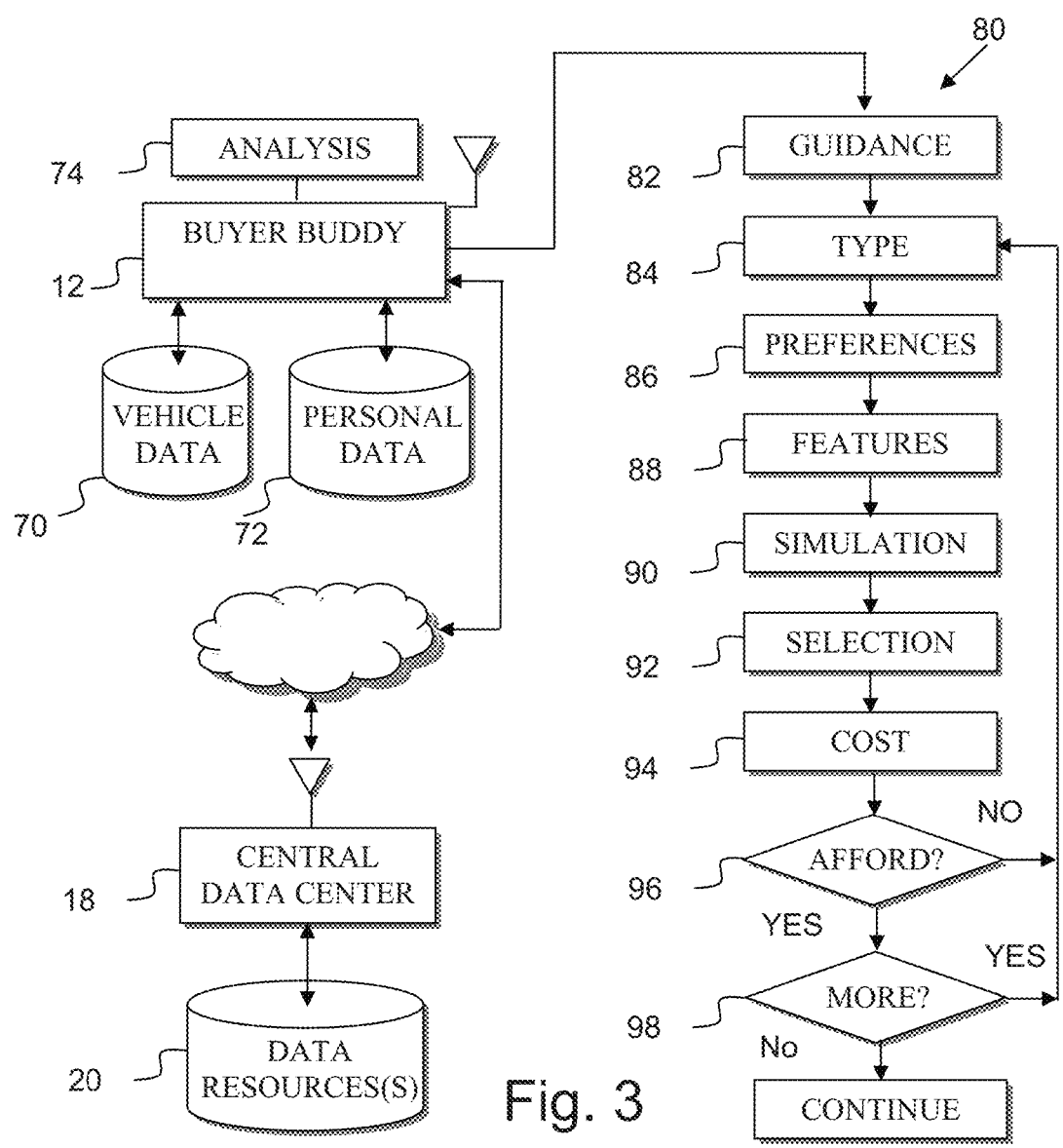
FIG. 3 is a flow chart of a method of obtaining information for providing vehicle acquisition assistance according to various aspects of the present invention.

Referring to FIG. 3, as noted above, the Buyer Buddy 12 may utilize vehicle data 70 and personal data 72 to assist a client in selecting an appropriate vehicle for acquisition. Moreover, the Buyer Buddy 12 may utilize a performance and an analysis engine 74 to assist in evaluating the vehicle data 70 and personal data 72 as will be described in greater detail herein.

An exemplary approach may be utilized to implement the steps of obtaining information at 42, evaluating financing at 44, generating profile(s) at 46 and identifying target vehicles at 48 into an iterative evaluation 80. The evaluation 80 comprises implementing guidance at 82, which may collect information from the individual. Based upon initial information, a broad field of target vehicles is considered at 84. Client preferences are evaluated at 86 and vehicle features are analyzed at 88. The features analyzed at 88 may include consideration of common features, standard features, or upgrade features. The evaluation of features may also consider new features that are not currently factory standard on a vehicle. For example, known customizations, such as may be implemented by the installation of the control and interconnection system 24 (and optionally one or more corresponding peripheral devices) may be considered. Additionally, simulations, driving performance evaluations, visual aids, models and other tools necessary to assist the Digi-Drive representative 22 in deriving relevant data may be performed at 90, e.g., to gauge whether a target vehicle is likely to meet the performance and other criteria established on behalf of the client.

The collected information at 90 may also be applied to further the vehicle selection process. A preliminary selection of vehicles is performed at 94 and a determination is made at 96 as to whether or not the target vehicle (or vehicle type) is within the preliminary price range established on behalf of the client. If the target vehicle price exceeds the preliminary price range, the process loops back to any previous step (shown looping back to the consideration of vehicle type at 84 for example). If the selected vehicle(s) are within the financial capabilities of the client, a decision is made at 98 as to whether addition vehicles should be considered. If so, the process loops back to any previous step (shown looping back to the consideration of vehicle type at 84 for example). Otherwise, the process is complete and the initial group of target vehicles has been identified.

The iterative loop back process further allows for the modifications of selection criteria being considered, such as to trim down the cost or to select different target vehicles, e.g., different makes, models, model year, etc., to accommodate a perceived need to modify existing features or requirements, add new features or requirements, eliminate features or requirements, reduce or eliminate costs, add additional features that are deemed to be of interest, implement exception processing, or otherwise adjust the feature set to achieve a selection which meets the satisfaction of the client. For example, a compromise between the desires and needs of the client, the target vehicle costs and the spending range conditions imposed on or by the client may be required for a specific set of conditions.

Referring to FIGS. 2 and 3 generally, an exemplary approach to obtaining information at 42 and/or guidance at 82 includes providing an initial contact with the client, explaining offerings and discussing the Digi-Drive options available to the client. Information is also obtained from the individual, which may comprise basic facts and other relevant information that may be useful in initiating pre-acquisition activities. Such collected information may be stored in the personal data 72.

Upon initial guidance at 82, a broad field of vehicles may be considered at 84. The evaluation of vehicle type at 84 may be a broad assessment of vehicle types that may be of interest to the client and may be limited for example, to identifying whether the vehicle is intended as a personal vehicle, work vehicle, recreational vehicle, etc. It provides a basis to start narrowing in the selection process. The vehicle type assessment at 84 may be derived from client feedback, observation, the intended use of the vehicle, the information obtained at 82 or other factors.

Client preferences may be evaluated at 86 by conducting an interview of the individual, e.g., via a local Digi-Drive representative 22 or via an electronic, on-line or other automated interview process. The interview may reveal facts, preferences such as wants or needs, restrictions, client interests, preliminary target vehicles, etc., which may be of interest in the process of helping a client select a vehicle. Preferences may also be gathered, such as those related to personality, temperament, tastes and other features associated with the client. In this regard, the individual may have an open platform to express preferences and features. Alternatively, a process may be implemented to present the individual with organized and itemized choices that may be selected. Such information may be stored, for example, in the vehicle data 70 and/or personal data 72.

The preferences at 86 and the information regarding features at 88 are derived to further narrow the vehicle selection process. As with previous examples, this information may be derived from the client or from other resources. As an example, psychographic profiles may provide insight into an individual's preferences and may also be instrumental in defining attractive features and possible accessory additions, e.g., as may be implemented by the control and interconnection system 24. Different perceptions of clients, i.e., psychographics, and other techniques may be utilized to determine what motivates clients so that appropriate services and control and interconnection system features, including peripherals and software enhancements, may be recommended to the client in an effective manner as an integral part of the vehicle selection process.

Moreover, the simulation at 90 may be utilized to extract information from the individual. The simulation at 90 may be used, for example, to capture physical factors and human performance factors to define information such as capabilities and limitations of the individual, physical measurements of the individual, etc.

A series of performance evaluations may further be performed as part of the simulations at 90. For example, by using a simulator including suitable visual, tactile or mental aids, an individual can be educated and evaluated for purposes of identifying desired or required vehicle and/or Digi-Drive options. The simulator and other tools may be used to derive preferences and/or a range of performance parameters that can be collected on individuals during the simulation/evaluation, and which may later be used, such as to program aspects of a control and interconnection system 24, described in greater detail herein. Moreover, the simulator and other tools used for evaluation purposes need not be complex. For instance, observation of physical needs and capabilities of specific clients may provide valuable information into the types of services and product customizations that are likely to be of interest to the client.

Measurements taken during the simulation at 90 may include for example, vision and reaction time, hearing, voice commands, strengths, tactile, mental coordination, stamina, identification, which may be visual, audible or from some other source. Additionally driving patterns and historical driving patterns as well as driver data and personal data may be collected.

Several exemplary human performance characteristics such as physical factors including arm length, torso length, visual and vocal capabilities as well as human performance factors including reaction time, visual movement coordination, strength and other corresponding factors may be considered in context with vehicle and machine capabilities and features to provide appropriate vehicle selections, e.g., to select target vehicles that are physically matched to the individual and which may be within the performance capabilities of the user.

Still further, objective-based categories such as driver performance may be considered as part of the simulation at 90 for analyzing driver interface considerations. Driver performance data may include features such as whether the vehicle environment is highly functional, provides more or less stressful conditions for the operator, etc. Additionally specific objective-based needs of the individual may be considered.

The obtained information including the simulation results may be evaluated, manipulated or otherwise processed, e.g., by the performance and analysis engine 74, to generate and store one or more profiles, psychographic evaluations, testing results and other information in the vehicle data 70 and/or personal data 72 (See also, the generation of profiles at 46 in FIG. 2). The various profiles provide a convenient approach to organize the client's requirements, desires and limitations and may also be stored, for example, in the vehicle data 70 and/or personal data 72.

In an illustrative example, a client profile may be generated, which characterizes the wants, needs and other considerations that are associated with a client who is in the process of acquiring a vehicle. The analysis of the client profile may be used, for example, as a factor to consider when deriving target vehicle types that may be appropriate for the client.

A personal classification profile may also be generated, which corresponds to personal classification information. Personal classification information may comprise, for example, preferences of the client, machine interface factors, a performance analysis, personal vehicle system requirements and other factors as will be described in greater detail herein.

The obtained data may also be used to populate one or more profiles such as a vehicle classification profile and/or a vehicle selection profile. The vehicle selection profile corresponds to selection information, and may integrate with or otherwise correspond to the vehicle classification profile and the personal classification profile. The vehicle selection profile includes information such as vehicle model, year, usage, mileage, quality, durability and other like factors. The vehicle selection profile may also store vehicle availability information, vehicle suitability information, feature performance, vehicle ratings, etc. Other data evaluations may also be performed.

The vehicle classification profile and other vehicle data may also be derived from online, electronic, hardcopy and other resources to evaluate vehicle information, such as to ascertain vehicle quality, dependability, usage and other suitable attributes. Further, such processing may consider not only the individual but also groups of individuals based upon available data. For example, data may be extracted from previous Buyer Buddy clients, from data collected across users of the control and interconnection system 24, etc. Still further, the obtained information may optionally be communicated back to a national database, such as the data resources 20 of the central data center 18.

In one illustrative example, client classifications are established that organize consumers into classes and exemplary lists of products, services and features that are most likely associated with that class, e.g., in the form of a feature array template. In this regard, common features may be organized into packages that are likely to be of interest to a large demographic of potential individuals.

By way of illustration, and not by way of limitation, an exemplary feature array template class may be designated a "commuter class". The features associated with the commuter class may include a music upgrade to include satellite radio, mp3, obstacle detection radar detection, GPS and real time traffic. Comparatively, a "young family" feature array template class may include features such as a DVD player, video games, redundancy or division of controls throughout the vehicle cabin, obstacle detection, emergency road service, and remote/keyless start and/or entry. Still further, a "business" feature array template class may include features such as 120 VAC outlets via an appropriate 12 VDC to 120 VAC conversion, corresponding electrical system and power upgrades, a dispatch or communication system, storage and security. As yet another example, a "vacation" feature array template class may include features such as trip destination, tow package, GPS, compass and navigation controls, on/off road optimization of vehicle performance, fuel optimization etc.

Any number of classes and features may be incorporated into the feature templates, and the feature templates may evolve over time and/or be different based upon geography, etc. Moreover, the psychographic profile of the individual may be used to determine the most appropriate demographic (or demographics) and thus the corresponding class(es) from the feature array templates to consider. Even people within a same demographic group may have different perceptions about the benefits or value of certain products offered as part of the Digi-Drive system and may thus be motivated for different reasons. Thus, further customization may be carried out to a level appropriate to the client requirements.

Accordingly, a generated profile of the individual may be based at least in part, upon the obtained information may comprise generating a psychographic profile of the individual and associating the psychographic profile to a predefined list of vehicle features, e.g., via one or more feature array templates, to evaluate in identifying target vehicles or classifying the individual using feature array templates that each define products, services and features that are most likely associated with that class of individuals for evaluation in identifying target vehicles. Moreover, the simulation, e.g., at 90, may be used to generate parameters associated with at least physical capabilities of the individual or physical measurements of the individual.

In order to recommend a vehicle to a client, the Digi-Drive representative 22 may understand the client's requirements, desires and limitations. As such, the simulation at 90 may evaluate driver interface considerations, which may be considered as part of an evaluation process. The driver interface considerations may be complementary and/or combined with market studies and other vehicle related knowledge. In this regard, the Digi-Drive representative 22 may recognize that some clients can fit into several categories so that care must be exercised to understand their preferences. For example, objective-based categories and vehicle measurements may be evaluated to determine appropriate driver interface considerations. Measurements corresponding with the driver personalization and preference information, such as may be recorded during the simulation at 90, may be associated with the capabilities and preferences.

As noted above, finances are evaluated at 44, 94, 96. In this regard, finances may be arranged, computed, predicted or otherwise evaluated. Many people may be unaware of how to compute suitable financing when shopping for a vehicle. Still further, may people may be too busy to effectively determine financial requirements when shopping for vehicle. Various aspects of the present invention may be utilized to bring financial considerations into play for an independent, informed vehicle transaction.

The vehicle and its selection criteria may be evaluated against a spending range or other measures of affordability that has been preliminarily estimated. The financing information may comprise, for example, preliminary estimates of funds for use in a potential acquisition, a limit setting determination of maximum funds to be used in acquiring a vehicle, etc. As a few illustrative examples, finances may be arranged and/or financial issues related to a vehicle acquisition may be explored. For example, a Digi-Drive representative 22 of the Digi-Drive system can assist the client in arranging financing.

The Buyer Buddy 12 may assist the client in ascertaining and understanding financial obligations and commitments, by assisting the client in arranging and securing financial sources, and by understanding what the client can afford in view of the client's existing financial obligations.

The data required to perform the evaluation may be derived from any combination of existing public, private and third party sources of data and may integrate with the Digi-Drive data center to update profiles, etc. The arrangement of financing may also be utilized to make the purchase of additional accessories easy and integrated into the vehicle purchasing process. For example, the cost of the Digi-Drive control and interconnection system 24 as well as various services, upgrades, features, etc., may be rolled into the arranged financing.

In one exemplary arrangement, a process begins by considering what vehicle payment will comfortably fit into the monthly budget of a client. Once a target range has been determined, the system may be utilized to compute and/or otherwise determine how much the client can put down as a down payment, how much they client will need to borrow, and or determine how much the client can afford to spend on a vehicle so as to make last-minute decisions unnecessary during the negotiation stage. In one illustrative embodiment, the Buyer Buddy system facilitates all the steps necessary to pre-approve the client for a loan, if a loan is necessary, with a local and/or nationally recognized lending provider.

For example, the Buyer Buddy 12 may perform an interview and guidance session with the client to evaluate a range of financial considerations so that the client can make an informed purchase decision. A monthly budget may be derived based upon information obtained during the interview process and a computation is made that is utilized to determine an amount of money which is required to meet the range of target vehicles that are to be evaluated for potential acquisition. The system may further facilitate the arrangement of pre-approved financing, e.g., through interaction with national and local financial lending institutions. Such pre-approval of financing is not required, but may be a beneficial, e.g., when entering into negotiations.

For example, the system may compute a predicted vehicle payment range, and, if the client provides suitable personal financial information, the system may factor existing client debt and financial obligations so that a comfortable payment range may be determined. The system may include and/or factor in considerations such as the price of the vehicle, the cost of insurance, anticipated cost of ownership including maintenance and fuel costs, extended warranty cost, trade-in allowance, depreciation and other expenses that affect the true cost of ownership of a vehicle. The considerations may be realized such as by polling national and local data sources, which may be stored at the data center, or independently maintained by third parties to the data center.

Referring back to FIG. 2, the identification of target vehicles at 48 and/or the retrieval of data at 50 may thus comprise comparing physical factors and/or human performance factors of the individual in context with vehicle and machine capabilities and features to select target vehicles that are physically matched to the individual. Other information, such as an evaluation of features including safety, reliability, and value of the vehicle make and model and year may also be evaluated. Thus, target vehicles may be selected that are physically matched to the individual. Additionally, the retrieval of data at 50 may comprise utilizing various electronic and hard copy sources of information. Moreover, the control and interconnection system 24 may be utilized to collect and log data from vehicles during use and over the life of the vehicle. This information may be conveyed back to the data center 18. Moreover, this data may be coalesced with logged data from numerous vehicles. As such, the mined control and interconnection information from the data center 18 may be retrieved and evaluated. As such, evaluation data may include baseline data as well as actual data that has been tracked and collected directly, e.g., from current users of the control and interconnection system 24 that are operating in the As another illustrative example, upon identifying vehicles of interest, a determination may be made as to the OEM vehicle specific accessory offerings. Such data may be stored and maintained in a suitable database 20 in the data center 18, or the Digi-Drive representative 22 may otherwise obtain this information. For example, manufacturers currently offer vehicles as standard packages, with a generally limited subset of optional accessories. Alternatively, aftermarket/third party providers offer numerous car care products and accessories that can be installed on the acquired vehicle as an aftermarket add-on. Such listings may be stored, for example, in a master accessories database that includes capability to search/sort the data based upon accessory and/or make/model of vehicle that the select accessory applies to. Alternatively, the Digi-Drive representative 22 may obtain the necessary aftermarket information from other suitable sources.

Based upon the aftermarket/third party accessory and OEM accessory listings, a master index may be created that identifies the available accessories e.g., for each target/candidate vehicle. This list may also be used, for example, while considering target vehicles. For example, by knowing the list of accessories available to a specific vehicle, the Digi-Drive representative 22 may be able to include or exclude the vehicle from the list of target/candidate vehicles considered for further analysis.

Also, the narrowing of target vehicles at 52 may be derived, for example, from local media sources such as the newspapers, trade magazines, online or Internet related sources, private sources, dealerships and other brick and mortar locations, classified ads, weekly shopper and giveaway papers, listings on college and business bulletin boards, word-of-mouth, national databases and other print media, online sources and other means may be utilized to identify candidate vehicles locally, regionally or nationally. For example, one or more local zip codes may be utilized to identify target vehicles within a region or radius of the client. These target vehicles can then be evaluated and narrowed down to a few candidate vehicles.

The field of target vehicles is narrowed down to one or more candidate vehicles. As an example, the selection of a candidate vehicle corresponds to the selection of a particular instance of a specific make, model and year of vehicle. Thus, a candidate vehicle may comprise a specific instance of a target vehicle that is to be evaluated for a potential acquisition.

Depending upon the implementation, the client may have the option of selecting among "packages" or degrees of customer service from the Buyer Buddy 12. An exemplary approach to differentiating such packages comprises determining the number of initial candidate vehicles to consider. For example, for a purchaser of a gold, platinum or platinum plus program (or other suited designation for premium service—compared to a standard package client), the Digi-Drive representative 22 may perform an initial confirmation of the current candidate vehicles and eliminate any candidate vehicles that fail to meet the confirmation requirements.

The performance and evaluation at 54 may comprise assigning vehicle ratings to the initial candidate vehicles. The ratings may be based, for example, on predetermined guidelines that define basic vehicle ratings and other information deemed of interest in evaluating the candidate vehicles. For example, a basic vehicle rating may be based upon a market value price of the vehicle, which may be further adjusted, such as in view of anticipated target vehicle mileage, vehicle wear, and/or other like factors. Moreover, modified ratings may be factored in to the vehicle rating. As an example, the Digi-Drive representative 22 may review and analyze resources external to the vehicle, such as vehicle survey and rating resources that provide information related to vehicle type, competitive vehicle types and/or similar vehicle types, such as may be published by private and government controlled vehicle related organizations. As another example, vehicle ratings may be adjusted based upon a visual inspection of vehicle, from observation of printed descriptions or other conveyances of information with regard to the specific vehicle, as well as consideration of information general to a vehicle model class and/or year.

Further, modified ratings may be based upon or otherwise adjusted by data stored at the Digi-Drive data center 18. The data at the data center 18 may provide relevant information, e.g., that characterizes vehicle and vehicle operator data, such as from a historical perspective. Such data may provide a unique insight into vehicle selection by providing relevant data on a regional, local and national level. Moreover, the data collected by the Digi-Drive data center 18 may be filtered based upon the type of client, thus addressing outlier cases and special circumstances that may not be reflected or accounted for using external data.

The candidate vehicles may further be assigned an overall rating based upon the basic and modified ratings. For example, the candidate vehicles may be evaluated for features, functions and configurations. Based upon the overall ratings, features, functions and configurations, the Digi-Drive representative 22 may reduce the initial candidate vehicle list down to a smaller number of vehicles, e.g., a list of three candidate vehicles. Alternative numbers of candidate vehicles may be selected based upon the particular circumstances of a given client. Also, a local vehicle availability search may be performed/updated to check for comparable vehicles that may be local or more local to the client.

Figure 4:
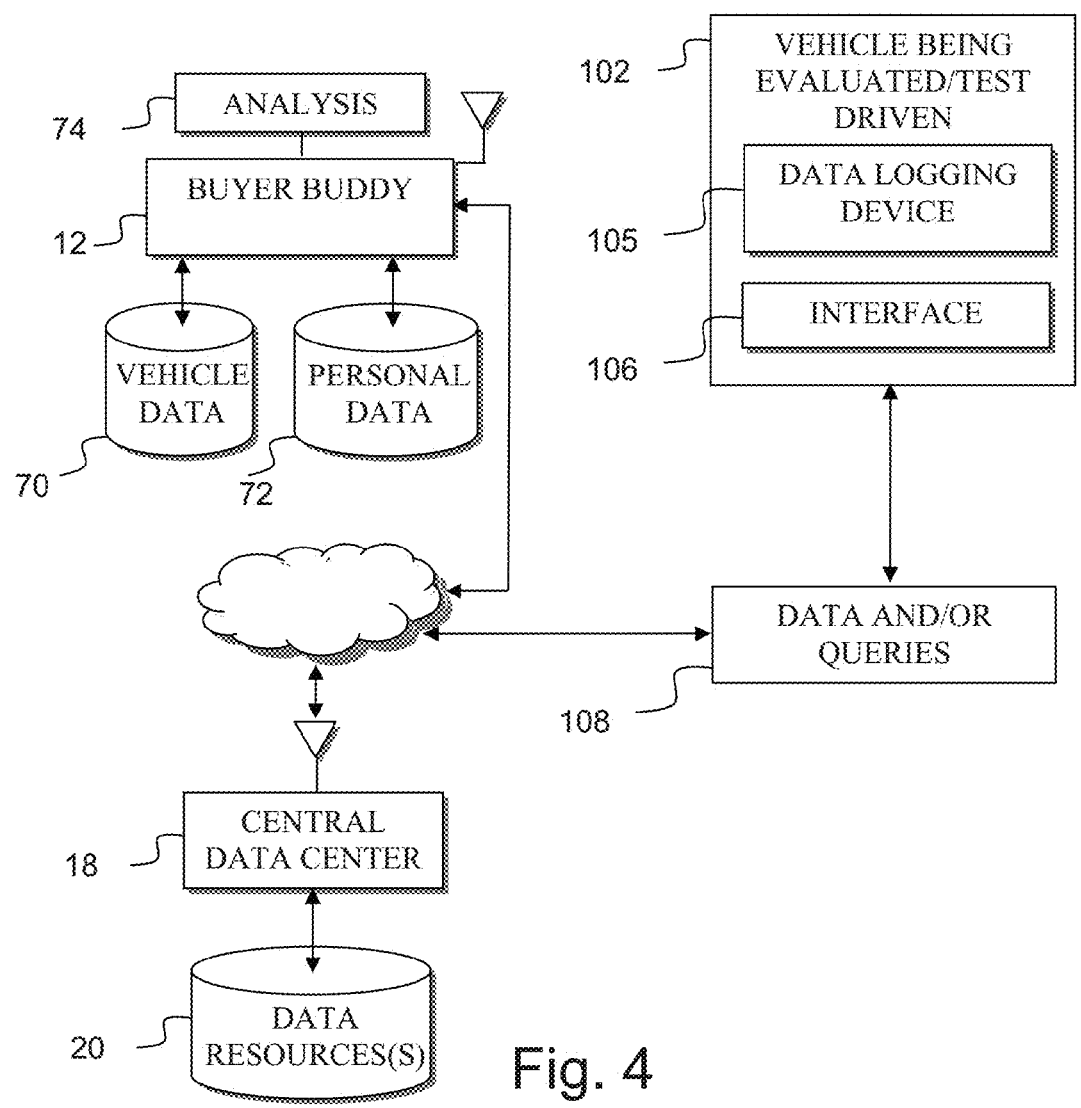
FIG. 4 is a block diagram of an exemplary vehicle evaluation process according to aspects of the present invention.

Referring to FIG. 4, the performance and evaluation at 54 may also comprise test driving the candidate vehicles. Before a test drive, an evaluation form or other organizational tool may be kept on paper and/or electronic means to track the different vehicles that are considered. This may be utilized for example, to show the client which candidate vehicles are being considered, so that selections may be confirmed prior to advancing to detailed evaluations, on-site test drives and other examinations of the selected candidate vehicles. A vehicle condition report may also be generated. For example, once a candidate vehicle has been selected, a condition report may be generated, derived or otherwise evaluated to ensure that the vehicle is fit cosmetically and/or mechanically. Further vehicle evaluations may be performed in addition to, or alternatively to those described above by either the Digi-Drive representative 22 or by the individual. Vehicle confirmations may also be performed, such as after generating a vehicle condition report for each of the remaining candidate vehicles.

Before a test drive of a selected candidate vehicle 102, a pre-drive briefing of the client may be performed, e.g. to review features of the selected vehicle and questions may be answered so as to prepare the client for the vehicle evaluation process. Function and feature familiarization and setup are then performed. For example, if the client is unfamiliar with the particular vehicle or of specific vehicle features and or capabilities, a familiarization process may be performed whereby the Digi-Drive representative 22 instructs the client on the appropriate and/or proper operation of the vehicle, vehicle accessories, or vehicle functions.

In the process of test driving a candidate vehicle, e.g., as part of the evaluation at 54, the Digi-Drive representative 22 may install a data logging device 105 in the candidate vehicle to collect data specific to the corresponding candidate vehicle, such as by recording vehicle parameters during the evaluation. The recorded data is stored in a database, such as the personal database 70 and/or database 20 of the data center 18. The vehicle parameters may be used as at least one factor in determining the acceptance rating for that candidate vehicle.

The data logging device may comprise any device capable of reading or otherwise obtaining information from the vehicle. As an example, the data logging device 105, e.g., a chip recorder, flight recorder, vehicle evaluation device or other data recorder is optionally installed in the test drive vehicle to sense, measure or otherwise collect performance measures, e.g., parameters related to vehicle performance. For example, the data logging device 105 may be installed in the vehicle's ODBII socket. An exemplary data recording device may comprise for example, the CarChip by Davis Instruments Corp. of Hayward, Calif., USA. Alternatively, the data logging device 105 may connect into a network of the vehicle, e.g., the vehicle's control area network (CAN) bus.

As another example, the simulation results, e.g., from the simulation at 90, may be used to generate parameters associated with at least one of physical capabilities of the individual or physical measurements of the individual. The simulation results or other obtained information from the individual, e.g., preferences, etc., may be used to customize the parameters logged by the data logging device.

The data logging device may also be configured to take data readings in other manners. For example, GPS, radar guns, accelerometers and other tools can be used to extract vehicle performance data in appropriate manners. The data logging device may be manually controlled and/or the data logging device may have automatic data logging features. Moreover, other necessary or desired devices, such as a proprietary Digi-drive monitor, a Digi-drive interface control and display may also be temporarily installed in the test drive vehicle. Accordingly, any calibration, set up or other steps necessary to prepare the data logging device for proper installation and/or operation is performed. Moreover, if a simulation had previously been run for the individual and/or if previous evaluations have been performed, settings from the evaluation and/or simulation may be input into the data logging device, e.g., to customize types or nature of the recorded events.

In an exemplary implementation, for a test drive, the client and/or Digi-Drive representative 22 adjusts the vehicle for proper operation and comfort, such as by adjusting the seat and the mirrors, and by ensuring that the seatbelts are suitably fastened. Once the client is suitably situated in the vehicle, the Digi-Drive representative 22 may query the individual so as to ascertain non-driving and non-performance related information. For example, the Digi-Drive representative 22 may query the individual to determine whether or not the target vehicle is comfortable from a driver perspective.

Also, the individual may be required and/or optionally have the opportunity to predict whether the vehicle is comfortable for short and/or long trips and/or whether or not there are any adjustments which cannot be suitably made thus rendering the vehicle inappropriate for meeting the target requirements, etc. Additionally, first impressions of sitting behind the wheel of the vehicle may be recorded. Questions related to fit, head room, legroom, aesthetics including color, the interior, styling or the options, may be asked and recorded. Additionally questions may also be asked, such as the quality of the gauges and control layout from a convenience standpoint of a particular client.

A test drive is then commenced and the data logging device is utilized to extract real performance data. For example, the Digi-Drive representative 22 and/or the individual may drive the vehicle and initiate a series of test drive sequences, such as to test braking, acceleration from a stop, acceleration while passing, hill-climbing power, cornering, handling, suspension, etc. During the tests, the data logging device may also record, compute, otherwise determine, infer, etc., vehicle parameters such as torque, speed, real power, emissions, fuel consumption, engine revolutions per minute, throttle data, heat, oxygen data and any other vehicle related characteristics that may be characterized during the test drive.

As yet a further example, a temporary interface unit 106 may be calibrated (if required) and optionally coupled to the data logging device using either a wired or wireless connection, e.g., a Bluetooth or other wireless technology. The temporary interface may be loaded with the preferences and optionally, any Digi-Drive features that the individual may be interested in, e.g., personal settings derived from the simulation or other obtained information as described more fully herein, e.g., with reference to FIGS. 2 and 3. This provides an opportunity to simulate at least certain features of the control and interconnection system user interface for the individual to interact with, e.g., to visually identify screen icons, menus, etc. to get a feel for the Digi-Drive features.

Such features may not be "live" as the vehicle may not be properly fitted for control and interconnection system 24. Also, this provides an opportunity to collect feedback with regard to individual's reaction to their originally identified preferences.

The temporary interface may also optionally include a communications interface. Such an arrangement allows real-time (or near real-time) extraction of vehicle data and communication 108 of that data back to a remote storage device. Still further, the communications interface may allow communication 108 to comprise queries to be remotely generated to the vehicle, e.g., such that a remote processing device, e.g. the data center 18 may be used to query the data logging device 105 for specific information during the evaluation.

The Digi-Drive representative 22 may also record additional vehicle information such as noted visibility including checking for blind spots, seat comfort/ergonomics, interior controls, audio system and other interface operations, engine noise, rattles and squeaks, etc., under predetermined or otherwise established driving conditions. The Digi-Drive representative 22 may also conduct and record post test drive queries of the individual to modify or otherwise compensate for pre-test drive responses.

According to an aspect of the present invention, the data recorded during the evaluation process at 54, which may include actual test drive data and information such as preference and opinion data obtained while querying the individual during the evaluation may be combined with cognitive information to generate biomechanical derived preferences. For example, as noted above, the individual may be consulted on vehicle operation comfort, convenience, ergonomics, headroom, leg room, control layout and other similar features. Further individual reaction to vehicle performance may be recorded. The observed and recorded data, e.g., recorded during initial individual interviews and simulations and during the evaluations at 54 may be correlated with the central care data resources 20 or other data resources, e.g., in the databases 70, 72, to accommodate the best possible test drive experience and evaluation.

Further, human factors considerations may be considered in part of the evaluation process, e.g., those related to safety, comfort, driver performance, capability, enjoyment, value, etc. For example, human factors evaluations may be characterized and/or considered for use when candidate vehicles are evaluated against the individual profile and vehicle type selection criteria. Still further, a 'living', i.e., adaptive or updatable/changing human/machine interface (HMI) template database may be created and stored, e.g., in a central database at the data center 18 so that templates of vehicle operator preferences can be tracked and managed. The performance criteria can then be evaluated to assign or otherwise modify an overall rating for each candidate vehicle.

Additionally, the level of evaluation may be based upon the client's package. For example, if a client has a preferred arrangement for Buyer Buddy services, a certain level of evaluation may be performed which exceeds the typical evaluation process performed for the selection of candidate vehicles for a client who purchases a "standard" arrangement for Buyer Buddy services. Vehicles may also be confirmed or otherwise more fully investigated for preferred clients, e.g., by providing more extensive research into vehicle history etc.

The Digi-Drive representative 22 may also inspect and/or collect other forms of performance and maintenance data such as certifications, inspection certificates, maintenance records, service reports or other information, such as from dealership or other servicing records that are related to the candidate vehicle. Information including data recorded from the test drive, as well as any inspection, certification and other documentation is transmitted to the Digi-Drive data center 18 for evaluation and/or storage and archival.

Still further, the vehicle may be inspected and/or certified during the evaluation. For example, the vehicle may be taken to a mechanic for an independent evaluation at 54. The mechanic performing the evaluation may be affiliated or otherwise associated with the Digi-Drive enterprise 10 such as through a local, regional or national distribution of partner service shops. For example, the Digi-Drive representative 22 may deliver the vehicle to a certified mechanic for an independent mechanical evaluation for individuals who have platinum or other preferred status. Inspection services from partners may also be made available for a nominal fee, or the client may arrange or specify client-selected inspection services. In this regard, the inspection/certification may be provided as part of a standard package for the Buyer Buddy, or the inspection/certification may be offered, for example, as part of preferred or premium services.

The collected data from the test drive may be transmitted to the Digi-Drive central data center 18. Baseline results may be analyzed so that data-driven decisions and objective comparisons may be performed. For example, a physical profile, performance bands or other metrics may be determined, which characterize the test vehicle, e.g., against average data for a corresponding class, i.e., make/model/category etc. of vehicle. The data collected from the data logging device may be used to provide insight into information that is not always available or easy to discover. Evaluations may be used to identify any incipient concerns over the specific tested vehicle, to compare specific performance with the performance of other measured vehicles, e.g., like make and model, and to compare the capabilities of the vehicle to client expectations.

Based upon the evaluation, an acceptance rating of each candidate vehicle is established, and a recommendation may be made as to whether or not the vehicle is likely to meet the requirements of the client, e.g., based upon the established acceptance rating. The acceptance rating may also be stored in one or more of the databases, 20, 70, 72 that is associated with at least one profile, e.g., for improving classification and selection mechanisms.

For example, data from the Digi-Drive data center 18 and/or databases 70, 72 may be used to generate a comprehensive client report, which may be based upon some predetermined reporting framework. The client report may include observed and recorded data collected in the test drive and evaluation as well as conclusions drawn from the interview and simulations that may have been performed during the initial evaluations. Thus, the client report may be utilized as an acceptance rating, or an acceptance rating may be derived from the client report.

Moreover, data associated with each test driven vehicle may be correlated with data maintained by the data center 18 to assist with vehicle evaluation. A comprehensive client report may characterize the vehicle against the data collected from the data logging device, from other sources, such as inspection certificates, client profile and other information gathered in the preceding steps. The acceptance rating, including the various collected information may then be used to assist the client and the Digi-Drive representative 22 in making an informed decision as to the value of the candidate vehicle, and whether the candidate vehicle is satisfactory for its intended purpose, i.e. to satisfy the needs, goals, desires and/or other requirements of the client. Moreover, the data center 18 may serve as a set of checks and balances to validate and verify the authority and accuracy of information derived from non-trusted locations, which may be reflected in any generated reports, etc.

If a determination is made that none of the selected candidate vehicles are acceptable to the individual, a new group of candidate vehicles may be selected, e.g., by looping back to 48 or any other previous process in the method of FIG. 2. This process can repeat as necessary, e.g., until a suitable stopping event, e.g., selection criteria/criterion has been satisfied. For example, if one or more of the candidate vehicles is deemed acceptable and likely to meet the client's requirements, then the process can continue.

The vehicle test drive and evaluation process may be iterative and repeated one or more times, e.g., by narrowing or expanding upon the selected target and/or candidate vehicles. Also, existing third party reports may be consulted, e.g., by compiling bar graphs or other presentations of data to compile a composite score for each vehicle in one or more feature categories. These scores can then be combined into the overall acceptance rating score for the corresponding vehicle. Additionally, further vehicle specific information can be added, or otherwise used to modify the ranking of a candidate vehicle. Thus, if, overall, a particular model is safe and is ranked as reliable, but the particular vehicle was in a previous accident or has some maintenance records that would impact the generalization of vehicle reliability, then these factors can also be considered to affect the overall score for the given vehicle. Moreover, vehicle accessories or installed options may affect the overall score. Still further, after-market devices, whether present or available for subsequent purchase, may be used to adjust the overall score. Thus, objective comparisons may be performed for each of the candidate vehicles which were test driven and/or otherwise evaluated.

As different vehicles are examined, e.g., either via in-person evaluations or via query such as via phone, email or over the Internet, detailed information about each vehicle may be compiled and archived, e.g., at the data center 18. As such, after an evaluation, a vehicle may not be selected for purchase. However information may be gathered from the vehicle which may be useful in evaluating a different client request. Reports may be generated from the evaluation forms to ensure that the selection criteria correspond with the desire of the client via a vehicle confirmation process.

During the evaluation periods, including taking any test drives, the individual can actively participate. Alternatively, the Digi-Drive representative 22 can evaluate the vehicles, and present the individual with only the top selections based upon the individual's criteria and the previously determined evaluation criteria. Still further, there can be other interaction between the individual and Digi-Drive representative 22. For example, the Digi-Drive representative 22 may do initial evaluations to eliminate or otherwise narrow down the candidate vehicles to a top tier. Given a top tier, the individual and/or the Digi-Drive representative 22 can perform final evaluations.

Still further, the manner in which the selection process is implemented can be based upon a particular service package purchased by the individual. For example, a purchaser of a gold, platinum or platinum plus program (or other suited designation for premium service), can select to have the Digi-Drive representative 22 perform vehicle evaluations without direct participation by the premium service individual. Under such an arrangement, the Digi-Drive representative 22 presents to the individual, a limited selection of candidate vehicles which have been prescreened and previously evaluated by the Digi-Drive representative 22.

At 58, a candidate vehicle has been selected, thus a negotiating operation is carried out to attempt to make a deal for the acquisition of the vehicle. If a deal is not completed, then control may loop back to any preceding step of the process for further vehicle selection.

As noted in greater detail above the Digi-Drive representative 22 may assist the individual in the negotiation stage of the vehicle acquisition. This may comprise, for example, a Digi-Drive representative 22 acting as a proxy or agent for the individual to negotiate a reasonable transaction price. The Digi-drive representative 22 may utilize resources, including proprietary and third-party resources to analyze and predict anticipated dealer overhead and cost based upon factors such as true market value and vehicle history data, such as installed options allowances for mileage, etc. Accordingly, the seller of the vehicle will be less likely to argue inflated numbers corresponding to associated dealer costs. For example, a CarFax report and/or other information derived from third parties may be utilized to modify or validate the Digi-Drive representative 22 estimations of dealer cost. The market value of a select vehicle may be checked, for example, by consulting Edmunds, the Kelley blue book or other appropriate publications. If the individual was pre-approved for financing or otherwise has funds available to satisfy the terms of the acquisition, such financing or funds may be activated to purchase the vehicle and to order the Digi-Drive control interconnection system for vehicle customization and personalization.

The acquired vehicle may be modified at 60, e.g., by installing and or fine-tuning specific personalized or customized features as selected by the individual and/or otherwise designated appropriate for the vehicle that has been acquired. For example, a Digi-Drive control and interconnection system 24 may be installed in the acquired vehicle, which may have been acquired in response to a vehicle acquisition recommendation provided at 56 or otherwise. In this regard, the individual may wish to customize and/or personalize the newly acquired vehicle beyond its purchased condition and/or obtain services such as those described more fully herein. Once the system is installed in the vehicle, the control and interconnection system 24 can be customized and/or personalized as necessary. For example, personal settings derived from the obtained data are loaded into the control and interconnection system and the control and interconnection system is configured as necessary to provide customized control over at least one vehicle feature on the acquired vehicle via a vehicle interface as described more fully herein. Also, information such as personal settings, configurations and other related data can be transmitted to the data center 18 for storage and archival purposes. Activity at 60 may also involve interaction with The Digi-Drive representative 22, e.g., to learn more about features, services and other options, to receive training, etc.

In this regard, The Digi-Drive representative 22 may also get involved in earlier steps, e.g., to provide assistance with issues related to technical vehicle matters, including the control and interconnection system 24 and how the system can be incorporated into a vehicle. In this regard, having the capability to customize a vehicle from its currently offered state may modify the selection criteria and the qualifications for target and candidate vehicles. These factors may have been considered by the Digi-Drive representative 22 in preceding activities, e.g., at 48, 50, 52, etc. Additionally service and upgrade agreements can be reached, such as for further customizing providing advanced features and options to the vehicle.

Additional fine-tuning may be performed at 62, e.g., at any time after the initial Digi-Drive system vehicle installation and customization. For example, over time, messages and diagnostic information can be transmitted from the control and interconnection system 24 to the data center 18 that may suggest the need for modifications. Alternatively two-way communication can commence between the Digi-Drive control and interconnection system 24 installed in the vehicle and the data center 18. Such communication can be utilized to provide or modify provided services, to adjust parameters, settings and other customized information, and to perform other tasks related generally to other fine tuning and on-going support of the control and interconnection system 24. Additionally, further customizations, modifications, adjustments and other changes may be made to the control and interconnection system 24, such as may be determined by the terms of any optional service and upgrade agreements.

Any necessary and/or desired peripheral devices, such as accessories for the acquired vehicle may also be ascertained, selected and installed. For example, during the initial interviews, the gathered personal facts may be used to determine whether an acquired vehicle further needs to be fitted with appropriate accessories to meet the suitability criterion. Exemplary services and capabilities of the control and interconnection system are described in greater detail here in as well as in U.S. Pat. No. 7,590,768, titled, "CONTROL AND INTERCONNECTION SYSTEM" and/or U.S. Pat. No. 7,596,636, titled, "SYSTEMS AND METHODS FOR IMPLEMENTING A VEHICLE CONTROL AND INTERCONNECTION SYSTEM", which have previously been incorporated by reference herein.

According to one aspect of the present invention, service including scheduled return of the vehicle with a predetermined period of time may be of interest to the individual to include further fine-tuning of Digi-Drive settings. As noted in greater detail herein, the control and interconnection system 24 is capable of two-way communication with the Digi-Drive data center. As such, for individuals too busy to return visit, or where upgrades and patches and other software modifications are available, remote upgrades and modifications may be performed through the transceiver with the control and interconnection system 24 on the vehicle.

The Buyer Buddy may be thoroughly trained on the latest products and technologies to help the individual find a vehicle and corresponding system. The Buyer Buddy representative may further handle the negotiation and the details of the transaction, from selection to installation of any accessories that are not on the acquired vehicle, e.g., the control and interconnect system. Moreover, according to an aspect of the present invention, the personal settings derived from previous simulations for road experience and evaluation may be entered into the control and interconnection system. Accordingly, when the individual takes possession of the vehicle, personal features are installed and ready for operation, e.g., hands free features such as voice commands, automatic connections such as blue tooth connections of personal electronics such as cell phones, personal data assistants (PDA), mp3s and other media players, etc.

The Buyer Buddy 12 may also be utilized by an individual, such as where the person is intent upon keeping an existing vehicle, but also desires to have the vehicle outfitted with a control and interconnection system 24. In this regard, the individual may go through the buyer buddy process by exposing the individual to control and interconnection options. The individual may be evaluated using the simulations, a test drive may also be implemented, e.g., using the data logging device 105 and interface 106, etc.

The Control and Interconnection System

Many vehicle operators compromise their driving experience because an acquired vehicle was not available with a choice of options desired by the driver. With the control and interconnection system 24, the vehicle operator may be able to select features of interest that may not otherwise be available to them. Examples may include message alerts, Bluetooth cell phone connectivity, passive keyless entry, obstacle detection, electronic compass, temperature readout, PDA docking, hot spot connectivity, music upgrades such as mp3 playback, remote engine start and A/C control, real-time traffic reports, hot/cold cups, hands free voice recognition, rear vision, sonar integration, rear seat entertainment systems, etc.

As described in greater detail in U.S. Pat. No. 7,590,768, titled, "CONTROL AND INTERCONNECTION SYSTEM" and/or U.S. Pat. No. 7,596,636, titled, "SYSTEMS AND METHODS FOR IMPLEMENTING A VEHICLE CONTROL AND INTERCONNECTION SYSTEM", already incorporated by reference, the control and interconnection system 24 may also be utilized to consolidate redundant vehicle functions and to optimize vehicle placement of components of the specific vehicle architecture. As an illustrative example, the control and interconnection system 24 may utilize a common data entry point may be provided as well as a common display screen and set of control buttons for accessing, controlling, and operating peripheral functionality and features for multiple, otherwise independent devices. Thus, peripheral providers need not provide redundant displays, I/O controls etc., if they chose to share the common controls. Where multiple peripherals share a common set of features, such as a display, I/O, etc., a vehicle supervisor provided as part of the logic of the control and interconnection system 24, maintains appropriate flow, permissions, security and access to the common components, e.g., as set out in greater detail in U.S. Pat. No. 7,590,768, titled, "CONTROL AND INTERCONNECTION SYSTEM" and/or U.S. Pat. No. 7,596,636, titled, "SYSTEMS AND METHODS FOR IMPLEMENTING A VEHICLE CONTROL AND INTERCONNECTION SYSTEM", already incorporated by reference herein. As used herein, the term "peripheral" should be interpreted broadly to include devices or other structures that include any combination of hardware and software, and that are capable of interacting with the control and interconnection system 24.

Moreover, certain aspects of third party offerings, e.g., aftermarket accessories, may be offloaded from the third-party device into reconfigurable portions, e.g., processing areas of the control and interconnection system 24 that are reserved or otherwise allocated for use by corresponding peripheral devices. This allows an integrated solution and reduces the cost of the third party offering, e.g., by eliminating redundant components. The integration of such aftermarket innovations into the control and interconnection system 24 further allows aftermarket providers an economical platform upon which to combine and consolidate aftermarket technologies.

It is possible that certain clients may not fully comprehend the level of customization available to a vehicle equipped with the Digi-Drive system. Alternatively, the client may not fully anticipate needs and or requirements for customization. Accordingly, a Digi-Drive representative 22 may be utilized to help a client by guiding the client through available Digi-drive options. For example, assume a client is interested in voice activation controls. The Digi-Drive representative 22 can educate the client in voice control options, train the client in how to use the features of the selected option, etc.

By understanding the hardware and software capabilities of the control and interconnection system 24, the Digi-Drive representative 22 may be uniquely positioned to assist a vehicle owner or operator in identifying the appropriate level of hardware and/or software of their control and interconnection system 24. The Digi-Drive representative 22 may also assist in configuring the corresponding Digi-Drive system for implementing customized vehicle capabilities and feature sets, and for identifying customized operational characteristics, e.g., by programming appropriate operational parameters and/or other vehicle-related customizations into a client's control and interconnection system 24.

For example, the Digi-Drive representative 22 may perform necessary setups and configurations to ease the client's transition with the new option. Thus, the Digi-Drive representative 22 may set preferences in the voice activation application, may help the client train the voice recognition system etc. This way, the client does not get discouraged with difficult to understand technology that is not adapted to the particular user. This interaction may be ongoing, beyond the initial purchase and installation of a control and interconnection system 24 into the client's vehicle. Moreover, there are often differences in the learning speed of individuals. As such, The Digi-Drive representative 22 can uniquely cater to the individual preferences and capabilities of the client, and provide the necessary level of ongoing support required for the client.

In one exemplary implementation, the Digi-Drive representative 22 establishes a compatible set of options from the available preferences described by a client. The Digi-Drive representative 22 may then wire the selection data back to the data center 18 for programming of a control and interconnection system 24 that is installed in the client's vehicle. As yet another example, the selection data may be downloaded into the portable device, e.g., wireless phone, GPS, etc., of the individual so that when the portable device is suitably docked in the vehicle, the control and interconnection system 24 supports the downloaded features.

By way of illustration and not by way of limitation, an individual who is relatively short may prefer options directed towards properly positioning floor pedals of the vehicles so that the operator is sitting a sufficient distance from the steering wheel airbag. With the intelligent capabilities of the control and interconnection system 24, pedal position can be arranged in cooperation with variable assist power steering efforts to find a comfortable rest position for the driver's heels and elbows, e.g., to optimize driving comfort, visibility, etc. As yet another illustrative example, an older adult may prefer increased display/graphic icon and letter sizes or improved night vision/driving capabilities. Many other synergies may be implemented across all facets of customization and personalization in the vehicle-installed and service aspects of the Digi-Drive enterprise 10.

It is recognized that various vehicle operators have individualized needs and/or desires. In this regard, each implementation of the control and interconnection system 24 or aspect thereof, can be customized to meet the particular needs and expectations of each vehicle operator on an individual basis, whether those needs comprise gadgets, convenience, customization, modernization, communication, personalization, etc. For example, a base package may comprise equipping a client's vehicle with a control and interconnection system 24 that includes a foundation of features such as communications and system command and control.

As noted herein, various aspects of the present invention may be implemented in "packages" or levels of customization and flexibility. This concept may be applied to the level of capability offered in a control and interconnection system 24. As an illustrative example, three "packages" may be provided, such as a "starter" or "express" package, a "premium" package and a "premium plus" package.

The starter package may include software that is loaded directly onto a portable electronic processing device possessed by the individual, such as a cellular wireless phone with display and processing capability, a pervasive computing device such as a hand-held device including palm personal computers, etc., or on a positioning device such as a GPS device or other electronic component that includes processing capability for use by the control and interconnection system 24. Thus, for example, a low cost entry into the Digi-Drive enterprise 10 may be implemented because the display, controls and/or two way communications may be implemented by a peripheral device already possessed by the individual.

Under this arrangement, the control and interconnection system 24 may include a dock, cradle or other support to load the individual's peripheral device when operating the vehicle. Otherwise, the portable electronic processing device may be otherwise positioned within the vehicle. The control and interconnection system 24 may also include vehicle-control interfacing hardware, such as a data acquisition device that communicates with the on-board diagnostic port (ODB II) of the vehicle or directly across the vehicle network bus in a manner analogous to those data logging devices described herein with reference to FIGS. 2 and 3. Still further, the dock or other device may provide for coupling other peripheral devices, such as music players, navigation systems and other devices such that a common interface may provide access to, control over, and customization over the various connected devices.

The premium and premium plus packages may include increasing levels of integration, such as those set out more fully herein in U.S. Pat. No. 7,590,768, titled, "CONTROL AND INTERCONNECTION SYSTEM" and/or U.S. Pat. No. 7,596,636, titled, "SYSTEMS AND METHODS FOR IMPLEMENTING A VEHICLE CONTROL AND INTERCONNECTION SYSTEM", already incorporated by reference herein.

As an illustrative example, during operation of a vehicle, a supervisory control of the control and interconnection system 24, e.g., a supervising processor, may provide control information to identified peripherals as necessary to implement a customized overall configuration. By allowing the control and interconnection system 24 to provide supervisory control, a corresponding peripheral or group of peripherals can respond to control commands from the control and interconnection system 24 in a coordinated manner.

The control and interconnection system 24 need not replace the processing typically performed by dedicated controllers. Rather, the control and interconnection system 24 may oversee peripheral controllers, e.g., by programming them with high level (supervisory level) command information, such as by modifying parameters, set points, operating modes or by providing other peripheral control commands related to vehicle performance. Thus, in one characterization of the control and interconnection system 24, a supervisory processor may provide control information to at least one peripheral associated with the control and interconnection system 24 to coordinate performance characteristics of related and/or unrelated identified vehicle peripherals, such as may be based upon at least one determined operating condition.

A second characterization of supervisory control relates to overseeing and/or controlling the actions of the various processes and functions performed by components of the control and interconnection system 24 to facilitate interaction between otherwise independent peripheral and vehicle specific devices and components.

As an illustrative example, an interface to a control and interconnection system 24 may comprise a freely programmable set of buttons, which utilizes switch technology with intelligent multiple function button assignments to reduce the number of required switches for a variety of electronic buttons. For example, a limited number (e.g., 4) buttons may be used to support multiple vehicle functions, e.g., telephone, seat position, climate control and audio/video. Graphics and other indicia may be revealed as icons, such as by using rear-projected color LEDs and an optical fiber to illuminate a button blank so that there are visual cues as to the state of the previously programmed buttons. Alternatively, a touch panel display may be utilized such that the display of information for multiple devices, and the buttons or other controls necessary to operate those devices, is integrated into a single component.

Control and Interconnection System Architecture

The control and interconnection system 24 may be implemented so as to strike a balance between centralized and distributed processing. One aspect of the control and interconnection system 24 that enables such balance is a system core that provides the ability of a vehicle supervising processor.

As used herein, the terms "supervisor", "supervision", "supervisory", "supervisory control", etc., may be used in several different contexts to describe a characteristic of control, oversight and/or management related to at least one aspect of the operation of an implementation of a control and interconnection system 24. For instance, aspects of the control and interconnection system 24 may provide supervision in terms of personalized feature integration, vehicle peripheral/feature integration, multi-processor integration, etc. Moreover, the Digi-Drive enterprise 10 may provide supervision over the development and sales domains of the enterprise.

Thus, the supervising processor of the control and interconnection system 24 may oversee other controllers, such as may be associated with peripherals provided with the vehicle, with native vehicle controllers, and with Digi-drive provided controllers operating under the control of the control and interconnection system 24. The vehicle supervising processor may also be able to supervise and control functions of a processing space of a corresponding system core. For example, the system core of a control and interconnection implementation may comprise a reconfigurable processing environment capable of allocating hardware and software space among multiple, diverse peripherals for application and/or peripheral specific processing. The system core may further include a combination of hardware and software for performing various system and administrative functions including support of its processing environment as will be set out in greater detail herein.

Figure 5:
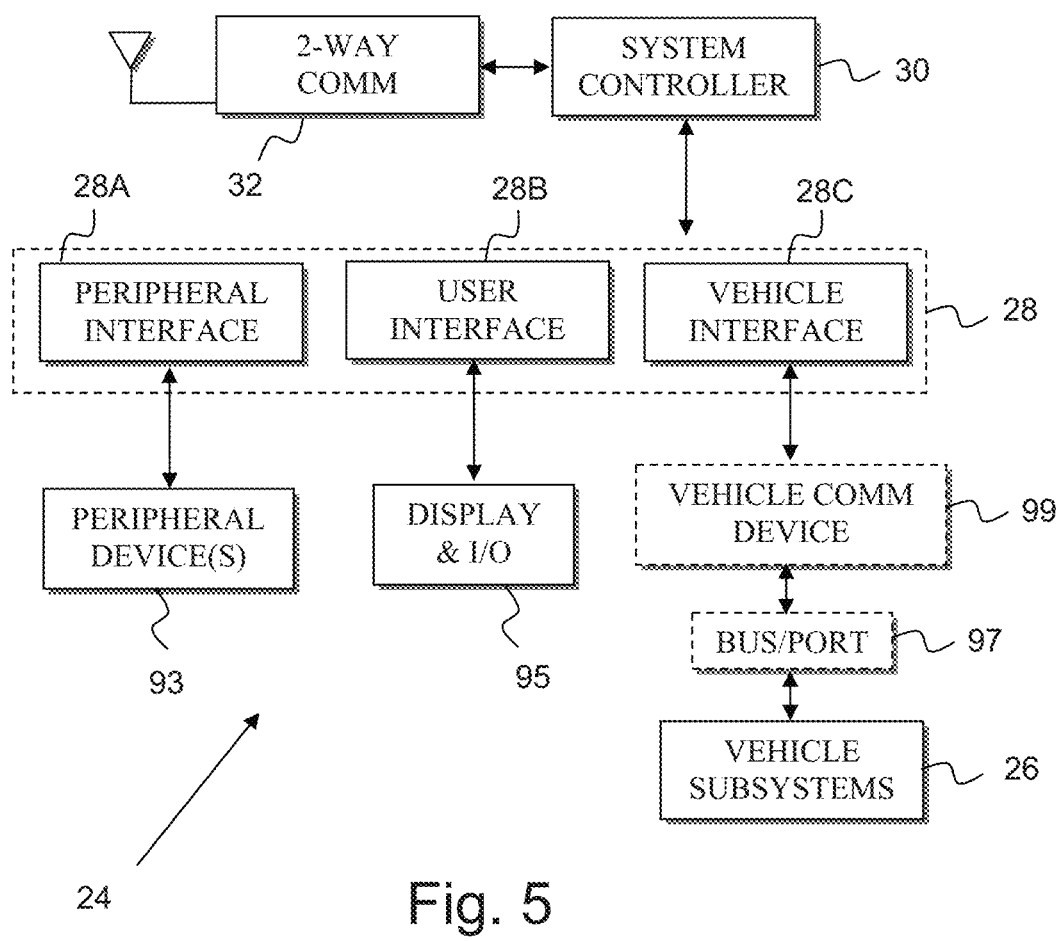
FIG. 5 is a block diagram illustrating an exemplary implementation of features of the control and interconnection system according to various aspects of the present invention.

Referring to FIG. 5, a block diagram illustrates an exemplary view of select features of the control and interconnection system. The system interface(s) 28 may be broken down into a peripheral interface 28A, a user interface 28B and a vehicle interface 28C. The peripheral interface 28A is utilized to communicate with peripheral devices 93. As an example, the control and interconnection system 24 may exchange data with a peripheral device 93, integrate information from the peripheral device 93 in making vehicle decisions and/or the peripheral device interface 28A may be used to communicate personalization information to the peripheral device for customized control and/or supervision thereof.

The user interface 28B couples to input/output devices and or a display 95 and may be used, for example, to provide a common interface for one or more features of the particular control and interconnection system implementation. The vehicle interface 28C couples to the vehicle subsystems 26 as described more fully herein. In this regard, the vehicle interface 28C may couple directly to the vehicle subsystems 26. Alternatively, the vehicle interface 28C may couple to a bus or port 97 of the vehicle, e.g., a control area network (CAN) bus, an onboard diagnostic port (ODBII) port, etc. Still further, a vehicle communication device 99, such as a hardware device that couples to the vehicle subsystem 26, port/bus 97 or other vehicle structure may be used as an intermediary between the vehicle interface 28C and one or more corresponding vehicle features. In this regard, the vehicle communication device 99 may include data capture and monitoring capabilities, as well as communication capabilities for exchanging information, e.g., set points, supervisory information, etc. with vehicle components.

As noted in greater detail herein, various aspects of the present invention provide for flexible implementation of the control and interconnection system 24. For example, the system interfaces may be implemented as software that is loaded into a peripheral device 93, such as a pervasive computing device, wireless phone, portable navigation system or other processor that can be transported into the vehicle. Thus, the peripheral device itself may already include a display, input/output controls and/or wireless communications capabilities that may be leveraged by the control and interconnection system 24. Thus for example, where the peripheral device 93 comprises a wireless phone, etc., the peripheral device itself may also facilitate the wireless communication with the data center 18. In this regard, the system controller 30 may be implemented as software that runs on or in conjunction with the processing capabilities of the wireless phone (or other capable portable processing device).

In addition to, or as an alternative to the above, the control and interconnection system 24 may be implemented as a vehicle integrated midplane system having reconfigurable memory as described in greater detail below and as set out more fully herein in U.S. Pat. No. 7,590,768, titled, "CONTROL AND INTERCONNECTION SYSTEM" and/or U.S. Pat. No. 7,596,636, titled, "SYSTEMS AND METHODS FOR IMPLEMENTING A VEHICLE CONTROL AND INTERCONNECTION SYSTEM", already incorporated by reference herein.

Figure 6:
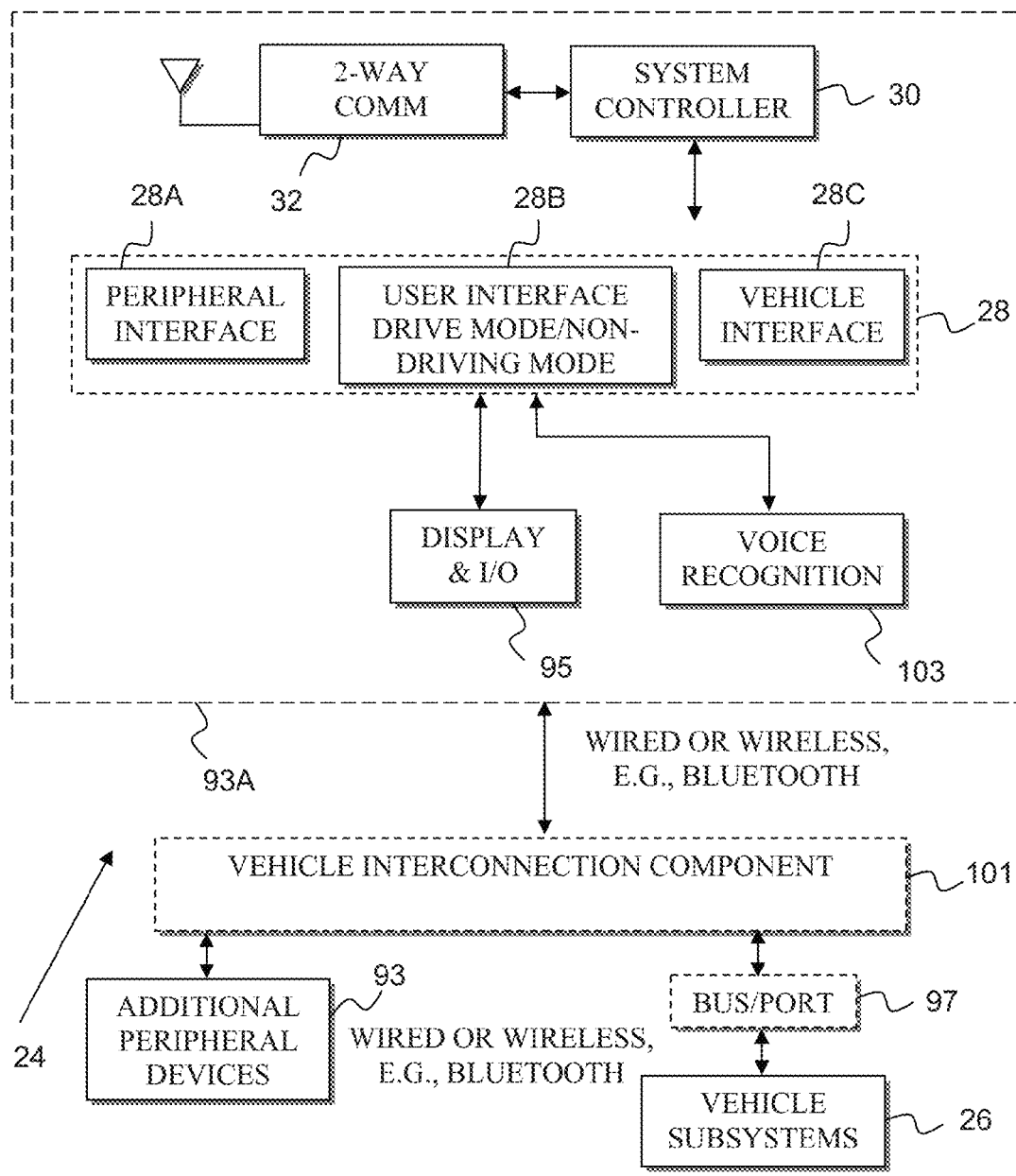
FIG. 6 is a block diagram illustrating an exemplary implementation of features of the control and interconnection system as an alternative to that illustrated in FIG. 4A according to various aspects of the present invention.

Referring to FIG. 6, yet another alternative configuration is illustrated. As illustrated, a peripheral device 93 is implemented as a portable electronic processing device 93A, which may include for example, a wireless phone, GPS, palm computer, etc., that has been programmed, e.g., via a software download to operate the system interfaces 28, the system controller 30 and two way communication of the control and interconnection system. Thus, the portable electronic processing device 93A may provide GPS and/or communication capabilities built therein which is accessed and utilized by the control and interconnection system. The portable electronic processing device 93A may dock, rest or otherwise be positioned within the vehicle so as to be able to communicate with a vehicle interconnection component 101 that couples vehicle components and other peripheral devices together. In this regard, Bluetooth and other wireless technologies may be used where hardwired communication is not practical or desired. As such, the portable electronic processing device 93A of the individual may be exploited to implement control and interconnection system features, but is not required to be permanently or even temporarily physically wired to the vehicle, thus promoting portability.

Under this configuration, the vehicle interconnection component 101 may itself include additional processing circuitry necessary to implement functions of the control and interconnection system 24 described more fully herein, including Bluetooth or other communications capabilities. If the vehicle interconnection component 101 is provided with electronic processing capabilities, the functions of one or more interfaces 28, the system controller 30, or other desired processing may be offloaded to the vehicle interconnection component 101 so that processing is shared between the portable electronic device and the vehicle interconnection component 101. In this regard, the vehicle communication device 99 described with reference to FIG. 5 or the vehicle integrated midplane system having reconfigurable memory as described in greater detail in U.S. Pat. No. 7,590,768, titled, "CONTROL AND INTERCONNECTION SYSTEM" and/or U.S. Pat. No. 7,596,636, titled, "SYSTEMS AND METHODS FOR IMPLEMENTING A VEHICLE CONTROL AND INTERCONNECTION SYSTEM", already incorporated by reference herein, may be substituted for the vehicle interconnection component 101. Thus, the vehicle interconnection component may not include vehicle supervisory processing capabilities, but may rather be an interconnecting arrangement to facilitate interaction between peripheral devices and vehicle components, e.g., by interacting with or otherwise monitoring the vehicle ODBII, network bus, sensors, controllers or other vehicle features, which are under the supervision of the control and interconnection system 24, e.g., the software executing in the portable electronic processing device.

As shown in FIG. 6, the peripheral interface 28A may be included in the software loaded into the peripheral device 93A to control the exchange of information between the control and interconnection functions and the native peripheral device functions. The user interface 28B may utilize the display and input/output native to the peripheral device itself, or additional, external display and/or input output options may be implemented. Still further, the vehicle interface 28C may serve as the software interface between the control and interconnection system code executing on the peripheral device 93A and the vehicle, e.g., via the vehicle interconnection component 101. In this or other implementations, voice commands may be implemented, e.g., via a voice recognition device 103 that integrates with the user interface. As such, the vehicle operator can navigate the menu options of the control and interconnection system that are executing on the peripheral device using hands free, voice initiated commands.

Still further, as illustrated, the user interface 28B may provide "modes" of display information, depending upon the task of the vehicle operator. For example, if the vehicle operator is driving the vehicle, the display of menu options may be in a "driving mode". The driving mode may reduce the number of menu options available to the vehicle operator, makes the controls larger, e.g., where touch screen is utilized, and sets the menu options to those capabilities relevant to driving. The user interface 28B may also support one or more "non-driving" modes. In the non-driving modes, the user interface may contain more data, smaller touch screen controls (if implemented), etc. The user interface in non-driving mode may also contain menu options that include non-driving related items. The menus may also be nested to provide a less cluttered interface for the user. As an illustrative example, the driving mode of the user interface 28A may contain options for music selection, navigation, hands free telephone calls and weather/driving information. A non-driving interface may include menu options to obtaining vehicle information, obtain/review logged information such as gas mileage, trip/travel distances, vehicle performance metrics, etc., as well as menu options for hands free phone usage, music selection, etc.

Figure 7:
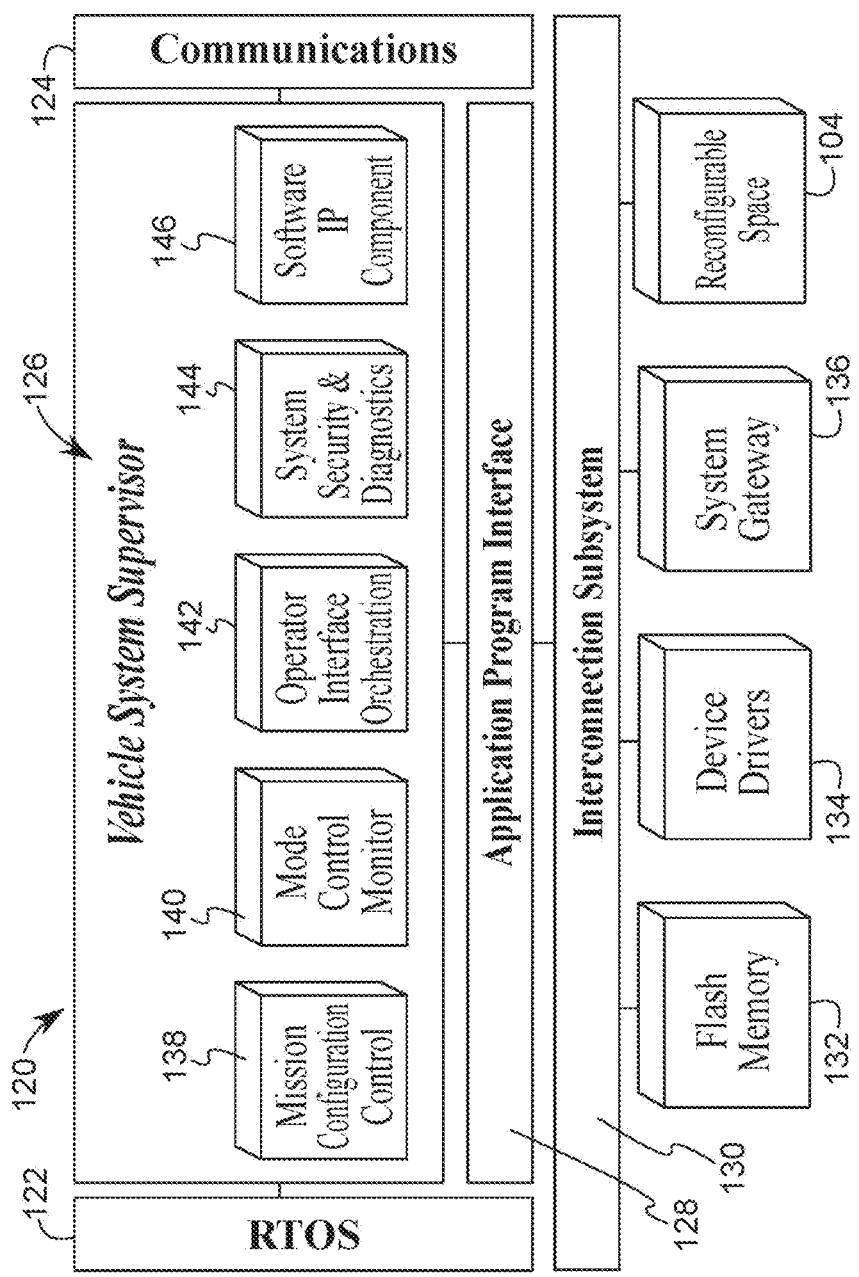
FIG. 7 a block diagram illustrating exemplary supervisory capabilities of a control and interconnection system according to various aspects of the present invention.

Referring to FIG. 7, an exemplary architecture 120 of certain elements of a system core (such as the system controller 30 illustrated in FIG. 1) illustrates an exemplary implementation of a supervising processor and at least certain of its corresponding interconnections corresponding to an implementation of a control and interconnection system 24. The below examples illustrate various capabilities that may be provided, for example, in more integrated packages of features and options, e.g., in a premium or premium plus package. The architecture 120 includes generally, a real time operating system (RTOS) 122, a communications interface 124, a supervising processor, which is also referred to herein as a Vehicle System Supervisor (VSS) 126 to better distinguish its various exemplary functional components discussed below, an application program interface (API) 128, an interconnection sub-system 130, one or more memory devices 132 such as flash memory, device drivers 134, a system gateway 136 and a reconfigurable space 104.

The RTOS 122 may be operated on a general purpose processor, or on a suitable processor provided elsewhere within the control and interconnection system 24. The RTOS 122 provides an operating system for executing software, services and other functions provided by the control and interconnection system 24 and the various peripherals connected thereto. For example, the RTOS may be configured to run Windows CE by Microsoft Corporation of Redmond Wash., LINUX such as by Red Hat of Raleigh N.C., QNX Neutrino by Harmon International Company of Ottawa, Ontario, etc. As noted above, the operating system 122 may also be provided by the native platform of a peripheral device 93.

The communications interface 124 provides a communication path for a reconfigurable processing environment consisting of hardware and/or software, e.g., designated by the reconfigurable space 104 and other aspects of the system controller to communicate with other components of the control and interconnection system 24, including for example, other logic provided in the system core, such as an input module and/or output module.

The VSS 126 comprises a mission configuration control process 138, a mode control monitor 140, an operator interface orchestration process 142, a system security and diagnostics process 144 and a software component process 146 that collectively function together to oversee the operations performed in the reconfigurable space 104 and/or elsewhere in the control and interconnection system 24. The various VSS components may vary depending, for example, upon the platform upon which the VSS is implemented. For example, the VSS may comprise software that was developed using a software development kit to execute on an existing peripheral device, e.g., a wireless phone. As such, the limitations in processing power, memory and instructions processing capabilities of the specific platform may limit the nature and functionality of a particular implementation of the VSS 126.

Under an exemplary arrangement of the VSS 126, the mission configuration control process 138 provides configuration data to peripherals associated with the control and interconnection system 24 and/or to one or more of the processes of the processing logic and other control circuitry to oversee integrated operation or otherwise coordinate performance characteristics of various peripherals, e.g., based upon entered preference data. The mission configuration control process 138 may also receive commands issued by the peripherals for access to the reconfigurable space 104. Commands issued by a given peripheral that are suitably passed by the mission configuration control 138 are inspected by the system security and diagnostics process 144.

The system security and diagnostics process 144 insures that the specific configuration requested by or required by the peripheral is authorized and configured to execute properly within the core. The control and interconnection system 24 may further integrate with a graphical user such that an operator can modify the operator preferences. Further, an operator may alter the operator preferences based upon data stored on a portable memory device that may be temporarily docked or other suitable memory reading device, for reading by the system core.

As an example, the control and interconnection system 24 may be customized in terms of an identified "mission", e.g., nature of anticipated applications such as off-roading, towing, use as an industrial/work vehicle, vacation/travel vehicle, commuter vehicle, etc. Additionally, the control and interconnection system 24 may be further customized based upon operator preference, e.g., seat, mirror and cabin comfort settings, electronics options preferred by the operator, etc. Still further, a combination of mission and operator customizations may be implemented.

Moreover, during run-time, the system security and diagnostics processor 144 may be utilized to ensure that a given peripheral has suitable permission or is otherwise suitably authorized to access a requested information processing workspace, e.g., within the reconfigurable space 104. For example, the security and diagnostics processor 144 may be utilized to determine whether a configuration operates correctly based upon at least one of mission configuration settings identified by a mission configuration controller 138, configuration commands based upon driver settings and alternate parameters provided by the mode control monitor 140.

The mission configuration control 138 may also be customized and then fixed for an individual customer, such as a vehicle owner or operator, e.g., according to preferences, performance data and options such as those that may be stored in a configuration library, associated with the reconfigurable space 104. For example, performance parameters of included peripherals may be determined through driving the vehicle and by performing simulator tests, such as may be determined when the control and integration system 24 is integrated into an associated vehicle. Thus, the mission configuration provides supervision of the customized vehicle systems.

The mode control monitor 140 modifies the command issued by the peripheral to the system security and diagnostics 144 based upon detecting a particular operating mode or triggering event, i.e., performance characteristics. The mode control monitor 140 is further operatively configured to dynamically modify the control information based upon at least one determined operating condition, e.g., based upon at least one of sensed operational conditions, inferred operational conditions, sensed environmental conditions and inferred environmental conditions.

For example, a mode may change via one or more operator entered parameters such as "off-road" or "sport-handling" selections. Thus, a mission configuration process and a mode control monitor may cooperate to dynamically modify configuration data during vehicle operation, e.g., based upon at least one of sensed environmental conditions, inferred environmental conditions, sensed operating conditions, inferred operating conditions and operator preference data.

The operator interface orchestration process 142 provides a graphic user interface for an operator, technician or installer to communicate with the system core, e.g., during development, testing and/or programming of a specific information, including programming a specific information processing workspace of the reconfigurable space 104. The software component 146 securely retrieves and stores software components of the information processing workspaces 116 under the supervision of the VSS 126.

The API advances development of functions and features of third parties by allowing programmers and peripheral providers the capability to interact with existing software using predefined procedures, instructions and other forms of software to quickly and/or reliably build code that is compatible with the system core. Documented APIs for application classes, documented host/processor communication protocols, proven libraries of code, support packages and drivers may be provided with, and accessible from the system core. Moreover, the system core simplifies the design and development of peripheral features by handling and executing some or all aspects of the peripheral hardware and software infrastructure, e.g., using the information processing workspaces described more fully herein.

The interconnection subsystem 130 facilitates communications across both local and remote connections. For example, local (direct) connections may couple the control and interconnection system 24 to sensors, actuators, displays, input/output (I/O) devices. Further, services and other features may be implemented across vehicle systems such as a CAN bus, LIN bus or other communication pathway. Thus, control and/or data communication links can be established between the control and interconnection system 24 and vehicle brakes, suspension, steering, airbag, and other vehicle operative features across a common communications pathway.

Memory 132, e.g., flash memory, may be used to store information required by the system core, including data required by the RTOS 122 and/or software corresponding to the various information processing workspaces for various peripherals. The flash memory 132 may communicate with the RTOS 122 via the interconnection subsystem 130 or other suitable communications data path. Device drivers 134 or other software code may be accessed by the various processors of the control and interconnection system 24 via the interconnection subsystem 130 to obtain instructions on how to interact with the various peripherals installed in the system, thus the particular device drivers 134 will be application specific.

The system gateway 136 is the operational access port or communications hub for signals entering and exiting to the vehicle system supervisor 126 from the other logic of the system core. The system gateway 136 may provide necessary communication protocol conversion and message priority implementation, perform other operations to properly translate data as required by the specific implementation and/or serve as a master message controller. The implementation of a master message controller may be used to enable the different characterizations of supervision described in greater detail herein. This supervision oversight promotes vehicle intelligence and opens up an almost infinite variety of information transmission and control possibilities. A few examples presented for illustration, and not by way of limitation include:

a. Off road driving conditions are sensed using sensors coupled to the control and interconnection system 24, thus the Supervisor, e.g., VSS 126 alerts the appropriate vehicle subsystems for proper vehicle dynamic & powertrain control ranges & settings;

b. A GPS and terrain map system coupled to the control and interconnection system 24 indicates that the vehicle is approaching a hill to climb, thus the Supervisor VSS 126 alerts a hybrid powertrain of the vehicle for best torque/energy consumption;

c. Vehicle body windshield wiper senses rain and this input is communicated to the control and interconnection system 24, thus the Supervisor VSS 126 may communicate with a vehicle brakes controller and/or vehicle dynamics controller to compensate for potential slippery conditions;

d. A roadside transmitter transmits an alarm that is received by the control and interconnection system 24 indicating icy road conditions, thus the Supervisor VSS 126 informs the vehicle operator and communicates appropriate adjustments to the vehicle dynamic system;

e. A truck payload changes and this change is communicated to the control and interconnection system 24, thus the Supervisor VSS 126 calls for the vehicle suspension to be lowered and powertrain torque to be changed.

The control and interconnection system 24 may integrate logic processors, multicore processor architectures with soft core processing capability, key software elements, control and interconnection system elements and connections in an open and expandable environment to enable the next generation of ubiquitous product features in addition to those features already described. For example, a soft core processor may be included in the control and interconnection system 24 hardware for speed of performance and lookup tables (LUT) may be provided for flexibility of programming and for personal customization.

Moreover, the control and interconnection system 24 may utilize a dynamic partitioning to assign resources to the core processor(s), e.g., when assigning processing workspace within the reconfigurable space 104. Such adaptive partitioning capabilities may be used to prevent task starvation when performing a wide range of system functions substantially as described herein. For example, under this arrangement, demanding applications are assured that they will have the computational resources necessary to perform their functions. The integration of features such as reconfigurable or reprogrammable buttons and controls may be integrated with the concept of the reconfigurable control and interconnection system 24 and/or software to provide an input output generic implementation that allows easy subsequent reprogramming and/or reconditioning of vehicle operative controls.

Figure 8:
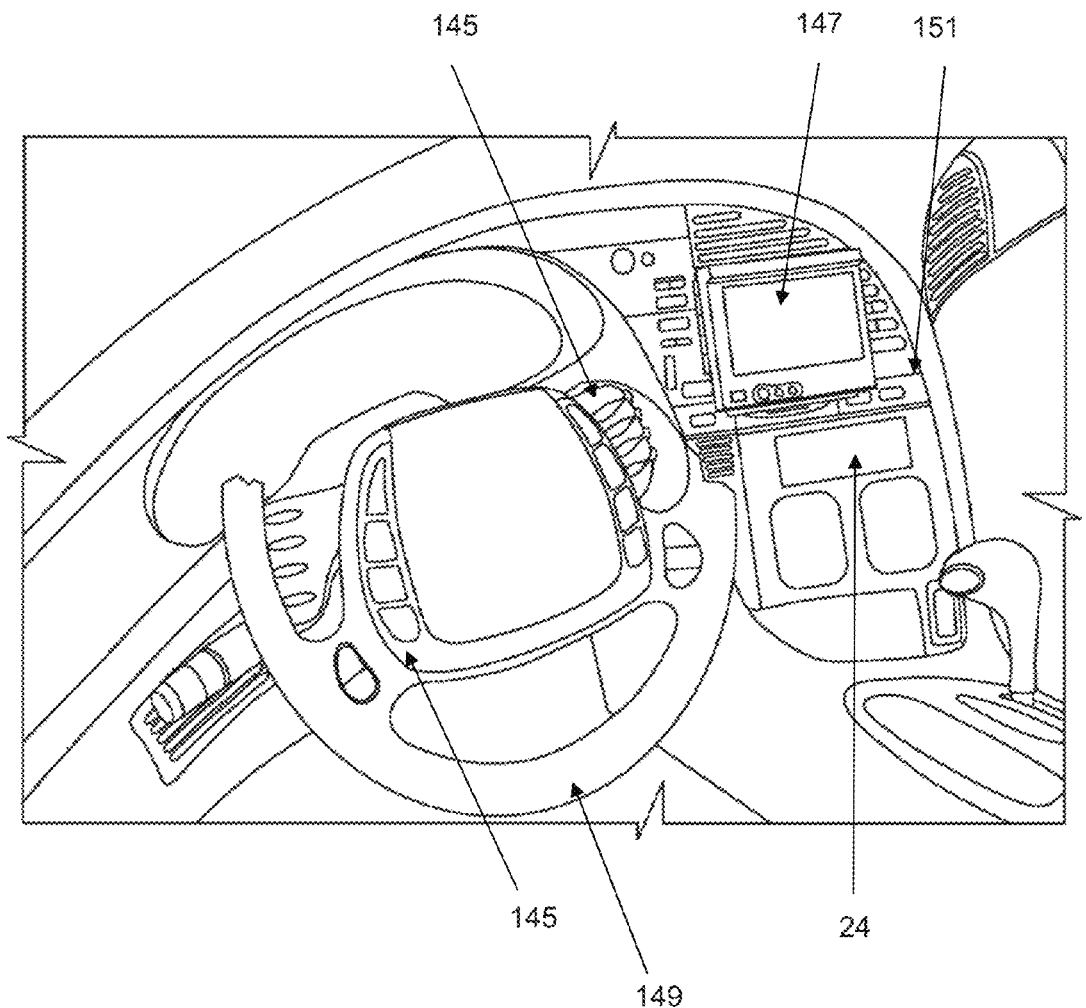
FIG. 8 is a view of the interior of an exemplary vehicle having a control and interconnection system installed therein, according to various aspects of the present invention.

Referring to FIG. 8, by utilizing available space in the interior of a vehicle having a control and interconnection system 24 installed therein, it is possible tap into existing controls 145 and displays 147 to add additional features which are not available at the time of the acquisition of the vehicle, regardless of whether the vehicle was acquired in a new or used state. Also, as noted above, peripheral devices may provide the display and/or input output capabilities themselves. Moreover, the display, e.g., a wireless phone, GPS, PDA or other device may be a permanently installed component of the vehicle or a docketed component of the vehicle. For example, the illustrated display 147 may be a portable GPS that is docked into a cradle or other storage location in the dash or other convenient location of the interior of the vehicle. In this regard, a dock (not shown) may be provided to properly secure the peripheral device(s). The display can by dynamically controlled to display menu options and perform functions that are supported by the specific implementation of the control and interconnection system 24. Thus, the menus and supporting screen displays can be updated to correspond with included features.

In practice, the control and interconnection system 24 may be located behind the dash, in a passenger kick area, integrated into an add-on display or other device, in a compartment in a trunk of the vehicle, or other practical position, depending upon the vehicle and other system integration factors.

Under this arrangement, for example, it may be possible to utilize an installed audio system and/or an upgraded version of an audio system within a vehicle to amplify and playback messages received by the system command and control via the communications interface. Where space is not available on the instrumentation panel, a touch sensitive display or other input and/or input output device can be added in a convenient position for operation and interaction with the vehicle operator via the control and interconnection system 24.

Input and output peripherals to the control and interconnection system 24 may be ergonomically engineered into the vehicle design, e.g., by including input/output control peripherals on the steering wheel, in dash, in the doors, trunk or other suitable location. For example, as illustrated, input/output control peripherals are implemented as several controls 145, e.g., switches that are provided on a steering wheel 149 and on a console 151. Moreover, control peripherals, including inputs and outputs can be distributed throughout the vehicle. This arrangement allows efficient sharing of resources in key locations within the vehicle, e.g., to provide a common or shared display in the vehicle dash, to provide a common data entry port, etc. Still further, a touch display may alternatively be utilized that functions both as the display and input/output device.

The interoperability of the various aspects of the present invention allow sharing of resources in an efficient manner such that available space, e.g., which is otherwise consumed with redundant aspects of processes, such as power supplies, processors, memory, etc. is offloaded to the system core of the control and interconnection system 24, thus numerous functionalities can be provided in a relatively small and clean footprint.

As noted in greater detail above, the control and interconnection system 24 can alternatively be implemented, e.g., using a portable peripheral device such as a wireless phone, navigation system or other processing device as the interface(s) to the vehicle and vehicle operator. In this regard, the peripheral device may also communicate with hardware of the vehicle and/or of the control and interconnection system 24 for enhanced and customized operation as set out more fully herein. For example, the control and interconnection system 24 may include a wiring harness that peripheral devices plug into. Thus, devices can be hot-swappable and/or portable. Moreover, such a wiring harness can more permanently interface the various implemented features of the control and interconnection system 24 to the vehicle.

Figure 9:
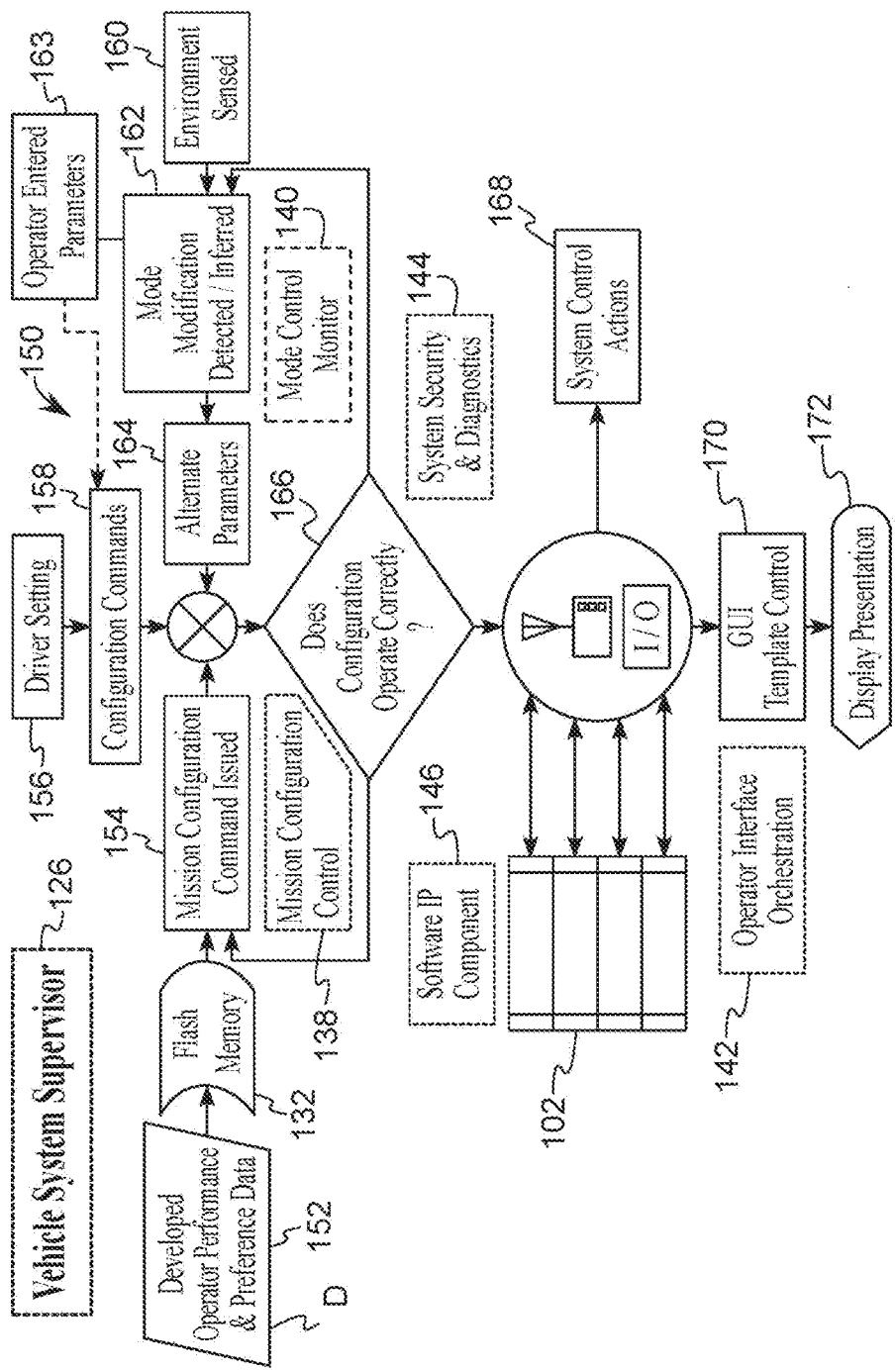
FIG. 9 is a flow chart of an exemplary interaction of the vehicle supervisor and vehicle components of the control and interconnection system according to various aspects of the present invention.

Referring to FIG. 9 and with reference in general to FIGS. 7 and 8, a flow chart 150 illustrates one exemplary interaction between a peripheral and the control and interconnection system 24. Peripheral D provides vehicle operator performance and preference data 152 for adjusting the operating characteristics of a vehicle based upon operator preferences. The performance and preference data may be loaded into the Flash memory 132, e.g., in a reserved memory area allocated as part of the information processing workspace associated with the peripheral D. At some point during operation of the control and interconnection system 24, a mission configuration command 154 is issued to the mission configuration control process 138 and the vehicle operator performance and preference data 152 is read out from the flash memory 132 via the mission configuration control process 138.

In addition, relevant software driver settings, e.g., from the device drivers 134, are retrieved at 156 and other related or necessary configuration commands are obtained at 158 e.g., as executed by other system configuration commands, such as those controlled by the vehicle system supervisor 126 to facilitate interaction between the control and interconnection system 24 and the peripheral D. Still further, the mode control monitor 140 may provide additional parameters or parameter modifications, e.g., as a result of sensing the environment at 160, detecting or inferring mode modifications at 162, or via providing alternative parameters at 164. For example, a mode may change via one or more operator entered parameters at 163 such as off road or sport selections. Thus, the mission configuration process 138 and mode control monitor 140 may cooperate to dynamically modify configuration data during vehicle operation, e.g., based upon at least one of sensed environmental conditions, inferred environmental conditions, sensed operating conditions, inferred operating conditions, and operator preference data.

Operating conditions used by the supervising processor to provide control information to the peripherals associated with the control and interconnection system 24, such as to coordinate performance characteristics of multiple peripherals, may be based upon operator preference data. For example, operator entered parameters 163 may be considered at 162 by detecting the operator values. As yet another example, operator entered parameters 163 may affect or otherwise influence configuration commands at 158. Also, new condition(s) may be detected such as by receiving an email at an Internet hot spot. As yet another example, a mode may change as a result of sensed operational conditions, inferred operational conditions, sensed environmental conditions or inferred environmental conditions. For example, conditions may be inferred from data analysis, such as slippery road conditions as inferred by data from an automatic braking system (ABS) setting. Thus, according to at least one aspect of the present invention, the VSS 126 controls hierarchical communications networks whose overall vehicle system configuration is customized and responsive to both operator selections and environmental conditions, which may be both sensed and inferred.

The system security and diagnostics processor 144 then examines the available data to attempt to determine whether the new configuration operates correctly at 166, e.g., within some predefined bounds, rules or other suitable operating characteristics. If the system security and diagnostics processor 144 does not approve the configuration, feedback is supplied to the mission configuration control processor 138 and/or the mode control monitor 140 to either bring the data into compliance or abort the operation, e.g., if invalid or improper authorization was given, etc. If the system security and diagnostics processor 144 authorizes the configuration, then the supervisory processor 126 implements various supervisory tasks, e.g., by providing control information to at least one peripheral associated with the control and interconnection system 24 to coordinate performance characteristics of potentially unrelated peripherals based upon at least one determined operating condition, e.g., the new configuration in the above example. Moreover, access may be granted to the various processing capabilities of the peripherals, e.g., to access the system core 12 including their associated information processing workspaces. For example, permission may be granted for the peripheral D to access the information processing workspace 116 associated with peripheral D in the reconfigurable space 104.

Additionally, the system core may take various control actions at 168 in the course of executing the software and/or hardware of the peripheral D. Moreover, the driver interface orchestration process 142 may provide a template control, e.g., via a graphic user interface (GUI) 170 and access a display 172 to provide visual, audible or other feedback to an operator, e.g., to modify, i.e., update, upgrade, access, install or remove the software and/or hardware corresponding the peripheral D.

On-the-go

Figure 10:
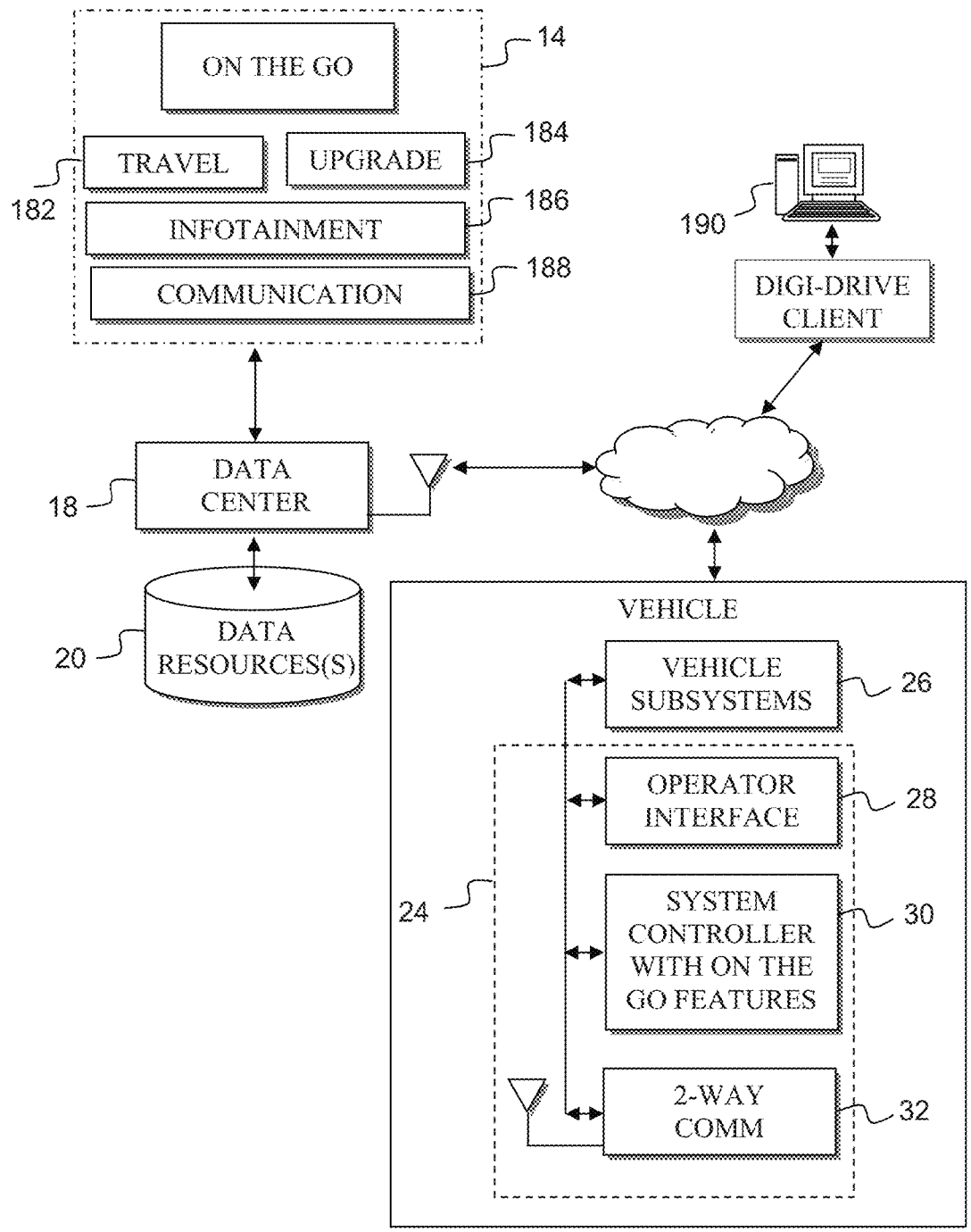
FIG. 10 is a block diagram illustrating an exemplary implementation of an On-The-Go component of the Digi-Drive enterprise.

Referring to FIG. 10, the On-The-Go service 14 interacts with the data center 18, e.g., by being implemented at the data center 18 or by otherwise interfacing with the data center 18, to integrate convenience services such as travel information 182, feature upgrades 184, entertainment and information 186 and communication 188 into a set of services directed towards client personalization. The On-The-Go systems may interact with vehicle operators directly such as by loading "On-The-Go" features into the system controller 30 of the control and interconnection system 24 installed in the vehicle. In this regard, the control and interconnection system 24 may communicate, e.g., via the two way communications interface 32. Additionally, an individual may interact with the On-The-Go services 14 via alternative communications approaches, e.g., via email, text messaging, interacting with an Internet web page, etc., that the individual may access from a fixed or portable computing device, etc.

The On-The-Go system 14 comprises a hybrid of telematics and infotainment which are integrated into a robust system of services and methods. In one illustrative example, systems integrate desired features, client products and services to provide telematic information as well as entertainment information to the vehicle in a package that can be offered on a subscription basis, offered as a service to preferred clients, or via other suitable arrangements.

The data center 18 may be utilized to implement aspects of the On-The-Go system on a "fleet" of Digi-drive users. As used herein, the term "fleet" is used in a general sense as a way to loosely identify a "virtual fleet" of vehicles, e.g., a class of vehicles that utilize services of the Digi-drive enterprise 10 in conjunction with a control and interconnection system 10, and which may be in data communication from time to time with the data center 18.

On-The-Go may comprise services and features such as travel related services that interact with a corresponding control and interconnection system 24 to provide travel information 182 including reservations, discounts, weather reports, weather conditions, trip tickets and other travel related data, tips for traveling, other navigation related resources that may be desirable by an operator of a corresponding vehicle, real-time traffic reports and other travel related services and information.

Many travel services of all kinds are available today from companies including airlines, discount providers, traditional travel agencies, etc. Each travel service has a computerized system that allows someone to search their website for personalized treatment. The Digi-Drive enterprise 10 may be utilized to exploit strategic alliances with such services and selected partners to convey the personalized data from the partnered services to the vehicle operator so as to facilitate specialized and personalized trip and travel information, including personalized way points of interest or of necessity.

In this regard, it is noted that because the control and interconnection system 24, which is installed or otherwise docked or positioned in the vehicle, maintains bidirectional communications with the data center 18, it is possible for the On-The-Go system to provide vehicle specific information with regard to travel, weather, navigation and traffic, taking in to consideration geographic and other environmental information without requiring direct input or intervention from the vehicle operator to ascertain the vehicle location.

As another example, the On-The-Go system 14 may facilitate a number of specialties or upgraded features of the control and interconnection system 24 using the feature upgrades 184. For example, if the vehicle operator purchases an add-on or upgrade package, such as a vacation package, towing package, off-road package, tracking services or other optional services, the On-The-Go system 14 may serve as a suitable channel to facilitate package specific communications. As one such example, the On-The-Go system 14 may provide vacation information, trip and travel maps and travel directions, itineraries, identify locations of rest areas, restaurants and geographic locations of interest. As another example, the On-The-Go system 14 may integrate with a vehicle installed towing package that communicates with the corresponding control and interconnection system 24 to provide information to the vehicle operator with regards to towing requirements, alternate routes for carrying loads, monitoring of towing related sensor inputs via the control and interconnection system 24 so as to provide towing related services.

As yet another example, the On-The-Go system 14 may provide entertainment and information 186. In an illustrative example, the entertainment and information 186 feature may utilize channels through which music and video may be downloaded to appropriate playback devices provided in the vehicle. The On-The-Go system 14 may also be used as a channel to provide games, software and other entertainment. In order to establish relevant information and entertainment which is to be provided to the vehicle operator and or others traveling in the vehicle, personal profiles may be set up and selections of infotainment may be based upon profiles which may be used to integrate features, such as parental controls for restricted access to certain types of information, preferences, such as for music news and other information desire to be received through the vehicle, etc.

The On-The-Go system may also facilitate, via the control and interconnection system 24, communications 188 that may be personal in nature and/or of interest to the vehicle operator. For example, the On-The-Go system 14 may be utilized to interconnect a personal data assistant (PDA), cell phone or other communications device to the central network of the data center 18. The On-The-Go system 14 may further integrate with, and utilize data derived from or otherwise extracted from, the control and interconnection system 24. For example, the control and interconnection system 24 may obtain and report a vehicle-related parameter, e.g., the vehicle's current fuel level to the On-The-Go system by monitoring fuel usage, consumption and other requirements based upon sensor inputs. The On-The-Go system 14 may then return additional information to the corresponding control and interconnection system 24 in response to analyzing the vehicle-related parameter (and optionally, the known vehicle position). For example, the control and interconnection system 24 may communicate the returned additional information to a vehicle display, e.g., to provide to the operator, fuel purchasing recommendations, fuel locations, etc. Further, the additional information may be utilized by a fuel monitoring system to initiate an alarm such as a beep or low fuel level warning. The necessity to trigger the low fuel warning may thus be based upon internal and/or external factors. For example, a fuel warning may be initiated based upon a level of remaining fuel, or the warning may be intelligently determined, e.g., by basing the low fuel level warning on the remaining fuel level in view of a detected proximity of a refueling station (e.g., if vehicle position is also known).

Still further, the On-The-Go system 14 may be utilized to provide communications related to personal information, which is not directly associated with vehicle operation and control per se. For example, the On-The-Go system 14 may be utilized to present shopping, restaurants, movie theater, landmarks and other locations of interest that may be desired by the vehicle operator.

By integrating infotainment capabilities, the Digi-Drive enterprise facilitates the portability of entertainment features using a host of available connection schemes to the vehicle's systems. The operator interface 28 may be personalized to the client's desires. Accordingly, combinations of existing aftermarket features, such as mp3 music playing capabilities, navigation systems, satellite radio, etc., may be further optimized through functional integration into the control and interconnection system 24, such as by sharing common controls, thus reducing the cost of entry of such aftermarket features and thus enabling the integration of technologies from diverse third parties into a cohesive and singular structure.

Personal communications offerings may be employed across a number of diverse and alternative communications technologies. For example, a simple communications interface may comprise a wireless cellular telephone which may be plugged in and connected to the control and interconnection system 24 to enable sophisticated infotainment applications such as shopping, checking current full fuel prices, etc. With onboard monitoring systems of the vehicle operating status, such as integrated into the control and interconnection system 24, the status of the vehicle can be periodically surveyed and problems may be detected, such as by detecting low pressure in the tires, brake drag, engine timing abnormalities etc.

The On-The-Go system 14 may further be configured to provide vehicle operator driving tips, such as speed acceleration reminders, warm-up times and other useful information to be dedicated to the benefit of the vehicle operator. Data generated by the control and interconnection system 24 may further be collected by the data center 18, and may further be utilized to determine statistics, such as average usages. Such statistics may be further relayed back to individual operators. This allows for example, vehicle operators of similar makes and models of the vehicle to evaluate the specific performance of their vehicle, such as in terms of fuel efficiency, maintenance and other factors relating to the use, and enjoyment of the vehicle.

Still further, client feedback and community features may be provided and shared with individuals, both at points of contact in the vehicle and outside the vehicle. For example, individuals may be provided with a capability to post to a bulletin or message board via a home computer 190, set up blogs or other on-line journals, provide feedback, suggestions and client developed solutions so that clients may also participate in products, features and configurations.

R.A.P.I.D

The R.A.P.I.D. service 16 may operate systems that interact with the data center 18 to integrate emergency services, roadside assistance and automation of repairs/diagnostics in a client personalized environment for vehicles connected to a corresponding control and interconnection system 24. As with On-The-Go 14, the R.A.P.I.D. system 16 may interact with vehicle operators directly via their corresponding control and interconnection system 24, or via alternative communications approaches. R.A.P.I.D. may be directed primarily to providing response to trouble conditions such as by providing customized vehicle emergency and technical assistance and services.

Figure 11:
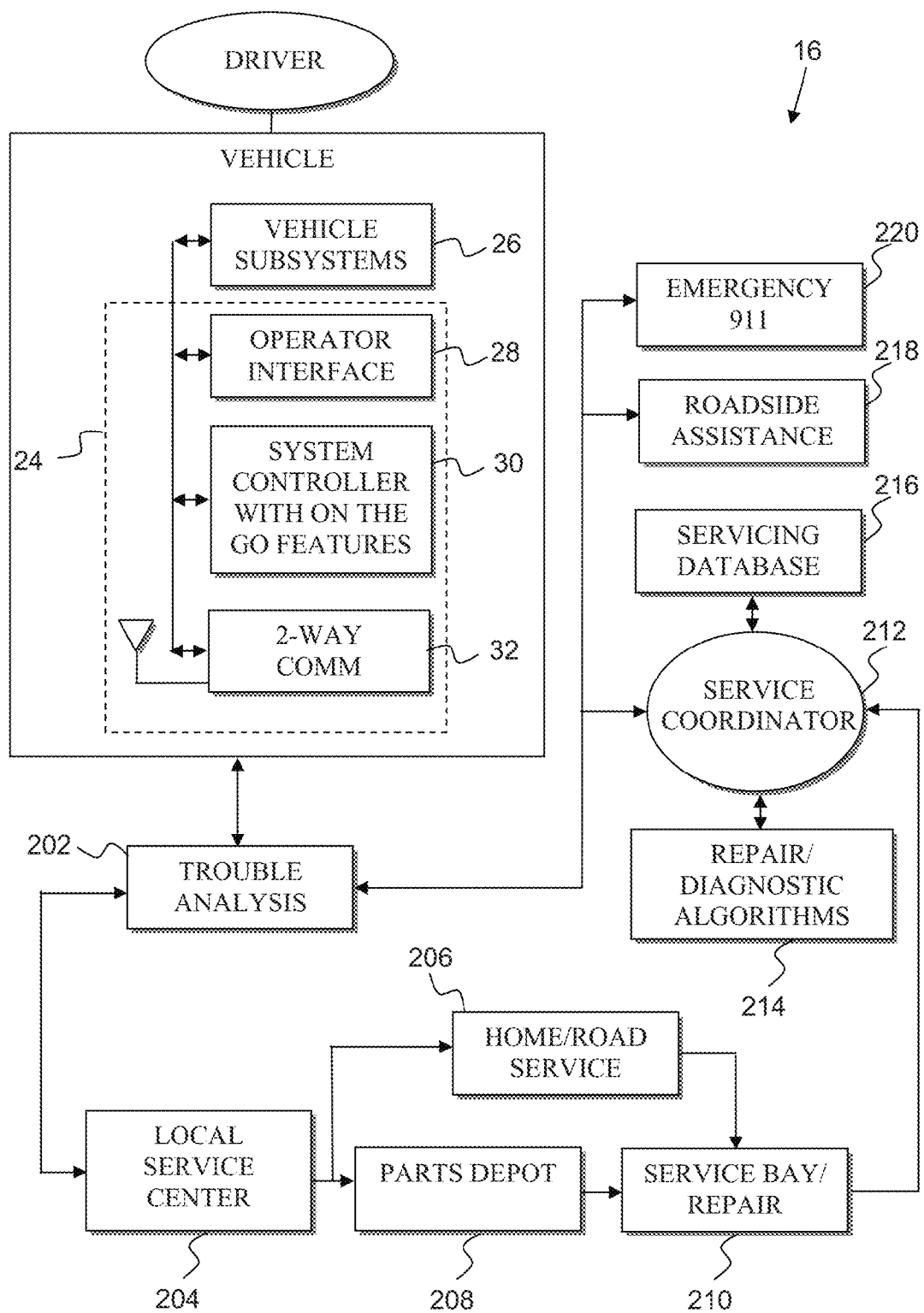
FIG. 11 is a block diagram illustrating features offered by a real-time anticipation program for interactive diagnostics to illustrate methods for diagnostics and maintenance of a vehicle equipped with a control and interconnection system according to various aspects of the present invention.

Referring to FIG. 11, the R.A.P.I.D. system 16 may be utilized to leverage the capabilities of the Digi-Drive enterprise 10 in cooperation with a control and interconnection system 24 in a proactive manner to maintain the health of the corresponding vehicle.

As noted in greater detail herein, the system controller 30 of the control and interconnection system 24 may be coupled to vehicle subsystems 26 which are integrated into the corresponding vehicle, e.g., such as via vehicle controllers, sensors, actuators, detectors, by a vehicle interface 28C. The system controller 30 further integrates with an operator interface 28B, such as for communications between the control and interconnection system 24 and the vehicle operator. The control and interconnection system 24 further utilizes a two way communications link 32 for communications between the vehicle and the data center 18.

Owing to baseline measurements that may be taken by the control and interconnection system 24, and based upon collected data, e.g., nationally collected information gathered by the data center 18 of the Digi-Drive enterprise 10, the R.A.P.I.D. system 16 may be used to analyze existing problems and anticipate potential problems. In certain cases, remedial actions may be taken to address the issues by downloading corrective algorithms to the corresponding vehicle. Also, if roadside assistance or other mechanical repairs are required, the control and interconnection system 24 in the corresponding vehicle may be used as a check to confirm diagnosis, to suggest the cause of the malfunction or necessity for roadside assistance and potentially to recommend an appropriate course to facilitate the repair.

The system controller 30 of a corresponding control and interconnection system 24 may thus communicate via a two-way communications link 32 with a server located at the data center 18, e.g., to initiate service, repair, predictive and other forms of preventative maintenance and health monitoring. For example, the two-way communication from the system controller 30 in a control and interconnection system 24 may be received by a trouble analysis server 202, or other server associated with the data center 18, that has been configured to distinguish communications from a control and interconnection system 24 that is in need of some form of assistance.

As illustrated, the trouble analysis server 202 may communicate with one or more local service centers 204 to communicate information describing the requested, predicted, necessary or otherwise desired maintenance of the associated vehicle. The local service center(s) 204 may comprise, for example, repair shops, towing companies, vehicle rental shops and/or other locations of interest that can provide the necessary and/or convenience services for the operator of the vehicle in need of assistance. The local service center 204 may in turn communicate with home and/or road service providers 206 such as vehicle rental shops, towing companies, etc. The local service center 206 may also communicate with parts departments 208 and other necessary sources to properly obtain required parts for servicing the vehicle, regardless of whether the servicing of the request comprises preventative, diagnostic, required servicing or other forms of attention. The home road service 206, parts depot 208 or other corresponding entities may further communicate with a service bay 210 or other suitable source, e.g., where the vehicle is to be serviced, depending upon the required action.

After the appropriate actions are performed on the vehicle, e.g., by proper servicing by the service bay, a repair verified message is communicated to a service coordinator 212. The message may include any useful information concerning the repair, including any appropriate metadata that can be compiled by the data center 18.

The service coordinator 212 may then communicate with the system controller 30 of the control and interconnection system 24 installed in the serviced vehicle, e.g., via the trouble analysis server 202, such as to verify or validate the repair, to collect information, or to otherwise verify that the event condition that triggered the servicing has been cleared.

The service coordinator 212 may also have access to repair and diagnostics algorithms 214, which may be analyzed for diagnostic and repair purposes. For example, a control and interconnection system 24 may enter communication with the trouble analysis server 202 to diagnose a problem. The control and interconnection system 24 may provide the trouble analysis server 202 with a series of symptoms or other known conditions, root causes of problems, or identifications of known problems. The trouble analysis server 202 may then interact with the service coordinator 212, which may consult the repair and diagnostic algorithms 214 to recommend diagnosis, suggest appropriate actions, or otherwise take corrective measures. The service coordinator 212 may also consult with a servicing database 216, such as to locate appropriate local service centers qualified to perform the diagnosed repair. The servicing database 216 may further provide real-time anticipation and interactive diagnostics support.

The service coordinator 212 may also provide information back to the system controller 30 of the vehicle's control and interconnection system 24 via the trouble analysis server 202 so as to enhance, update, repair, reprogram, or otherwise make available repair and/or diagnostic information to the vehicle. The trouble analysis server 202 may also communicate with other sources, such as third-party diagnostics, servicing and support such as roadside assistance 218, emergency assistance 220 or through other partners linked to emergency and response types of systems, etc.

Figure 12:
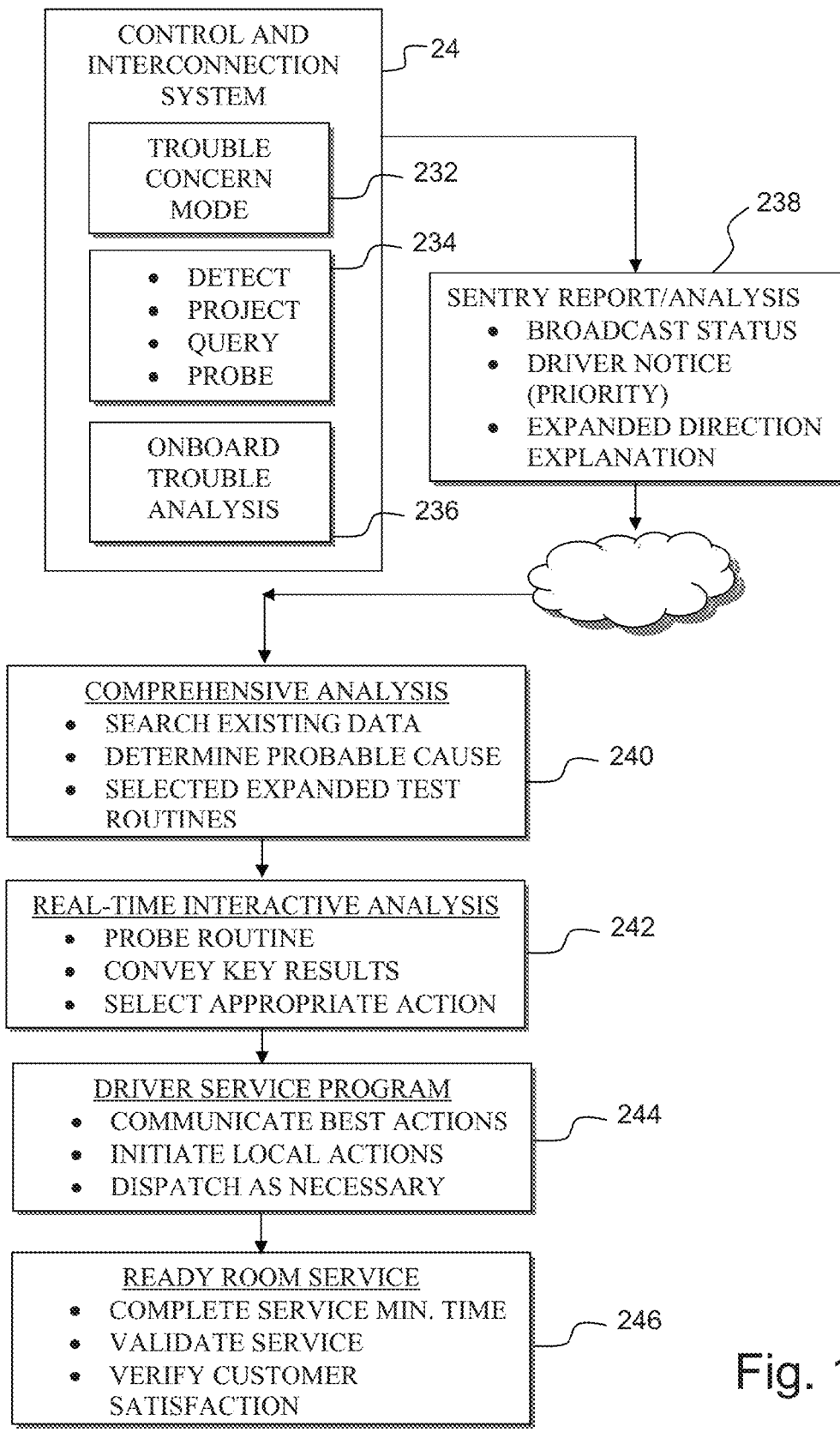
FIG. 12 is a block diagram illustrating a flow for obtaining diagnostics or service utilizing a control and interconnection system on a vehicle.

Referring to FIG. 12, as noted above, the control and interconnection system 24 installed in the vehicle may be equipped with a trouble/concern mode 232 that includes a monitor 234 to detect, predict, query and/or probe, receive or otherwise obtain information about vehicle systems to determine trouble or the potential for trouble compared to normal operation, such as by using an onboard trouble analysis component 236. The detection of a trouble area may trigger the onboard trouble analysis component 236 of the control and interconnection system 24 installed the vehicle wherein, a sentry report 238 and/or analysis may be performed by the control and interconnection system 24. Status information may be broadcast or otherwise transmitted from the vehicle, which may be received by the data center 18 or other appropriate source. Priorities and driver notices may be given and expanded direction explanation may be provided by the sentry report 238.

Upon detecting trouble, a comprehensive analysis may also be performed, e.g., at the vehicle and/or data center 18 by an analysis component 240. This may include, for example, searching existing data fields, determining the most probable cause for the detected trouble, selecting expanded test routines and performing other suitable analysis, evaluation, troubleshooting, predictive and adaptive techniques. Moreover, an interactive component 242 may provide real time, near real-time or off-line diagnostic interaction with the control and interconnection system 24 and/or interaction with the data center 18. For example, the interactive component 242 may provide central trouble analysis routines that perform interactive analysis, such as by utilizing one or more probe routines, e.g., to probe components for error codes, etc. The interactive component 242 may also investigate key information and provide key results reports, such as by selecting an appropriate action course from list of services etc.

In response to the interactive analysis, a driver care service program 244 may be implemented as part of the fleet services offered by the data center 18. For example, a driver care service program 244 may communicate a best action or most preferred cause of action, initiate local actions, such as by contacting roadside assistance and other appropriate sources, automatically dispatch road services, perform automated or semi-automated parts acquisition and or maintenance requests, etc. Further, a "ready room" 246 or "fast track" service may be provided as part of the care fleet services offered by the data center 18. For example, service repairs may be completed in minimum time by advancing the reservation of space in a service bay and/or by requesting in advance, appropriate service from local service providers.

Moreover, as noted above, the service may be validated, for example, by using the control and interconnection system 24 and its corresponding interface to sensor inputs and outputs, bus and/or port connections, etc., of the vehicle to verify that the appropriate corrective action has been successfully completed. However, with a successful vehicle repair completed, the data center 18 may further be utilized to ensure that the client is satisfied with services provided by the Digi-Drive enterprise 10, by third-party providers, such as repair shops, roadside assistance providers etc.

The various aspects of the present invention may be embodied as systems, computer-implemented methods and computer program products. Also, various aspects of the present invention may take the form of an entirely hardware embodiment, an entirely software embodiment (including software, firmware, micro-code, etc.) or an embodiment combining software and hardware. Furthermore, the various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system.

The software aspects of the present invention may be stored, implemented and/or distributed on any suitable computer usable or computer readable medium(s). For the purposes of this description, a computer-usable or computer readable medium can be any apparatus that can contain or store the program for use by or in connection with the instruction execution system, apparatus, or device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus or device. As yet further examples, a computer usable or computer readable medium may comprise cache or other memory in a network processing device or group of networked processing devices such that one or more processing devices stores at least a portion of the computer program product. As such, any physical memory associated with part of a network or network component can constitute a computer readable medium.

Computer program code for carrying out operations of the present invention may be written in any suitable language(s), including for example, an object oriented programming language, a conventional procedural programming language or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of customizing a vehicle driving experience, the method comprising:
   receiving, from a data center, a set of travel related services that are specific to an individual, where the set of travel related services include trip information for a trip and are received into a control and interconnection system associated with a vehicle, the control and interconnection system having:
     a vehicle interface that interfaces with vehicle subsystems;
     an operator interface that interfaces with an operator of the vehicle; and
     a system controller that communicates with vehicle subsystems using the vehicle interface, and which interacts with the operator using the operator interface;
   loading the set of travel related services into the system controller of the control and interconnection system of the vehicle operated by the individual;
   identifying, by the control and interconnection system, operational characteristics of the vehicle based upon the loaded set of travel related services and at least one vehicle sensor;
   communicating the operational characteristics of the vehicle extracted by the control and interconnection system to the data center;
   receiving personalized information from the data center in response to communicating the operational characteristics; and
   performing, periodically, an operation to modify at least one vehicle subsystem, by the control and interconnection system, in response to receiving the personalized information, while the vehicle is active during the trip.

2. The method of claim 1, wherein the operational characteristics include geographic information and environmental information without requiring direct input or intervention from the vehicle operator to ascertain the vehicle location.

3. The method of claim 1, wherein the received personalized information includes at least one of: vacation information, travel directions, itineraries, rest area locations, restaurants and geographic locations of interest.

4. The method of claim 1, wherein:
   the operational characteristics comprise information obtained from sensors associated with a towing package on the vehicle; and
   the personalized information received from the data center comprises at least one of towing requirements, and alternate routes for carrying loads.

5. The method of claim 1, wherein the set of travel related services comprise at least one of travel information, vehicle feature upgrades, and entertainment information.

6. The method of claim 1, wherein receiving personalized information from the data center, comprises:
   receiving at least one of: vacation information, maps and travel directions, itineraries, locations of interest, music, video, and games.

7. The method of claim 1 further comprising:
   setting up personal profiles that indicate at least one of restrictions and preferences, such that receiving personalized information comprises receiving personalized information that is based upon a corresponding personal profile.

8. The method of claim 1, wherein:
   utilizing the control and interconnection to monitor operational characteristics of the vehicle based upon the loaded set of travel related services, comprises:
     monitoring a fuel usage in the vehicle;
     communicating the operational characteristics of the vehicle extracted by the system controller to the data center, comprises:
       communicating the monitored fuel usage to the data center;
   receiving personalized information from the data center in response to receiving the operational characteristics, comprises:
     receiving and displaying on a vehicle display, at least one of fuel/energy purchasing recommendations, and fuel/energy locations, where the personalized information is based upon a combination of internal to the vehicle factors and external to the vehicle factors;
   performing an operation in the vehicle in response to receiving the personalized information.

9. The method of claim 1, wherein:
   loading the set of travel related services into a control and interconnection system in a vehicle operated by the individual further comprises:
   loading at least one after-market feature through functional integration into the control and interconnection system by sharing at least one common control between the after-market feature and the control and interconnection system.

10. The method of claim 1, wherein:
    receiving personalized information from the data center in response to receiving the operational characteristics, comprises:
    receiving for presentation on a display to the operator, data generated by the control and interconnection system, which has been collected and processed by the data center, pertaining to vehicle usage statistics.

11. The method of claim 1, further comprising:
    accessing a wireless cellular telephone connected to the control and interconnection system, such that the wireless cellular telephone functions as the operator interface to the control and interconnection system.

12. The method of claim 1, further comprising:
accessing a wireless cellular telephone connected to the control and interconnection system, which functions as the operator interface, where the cellular telephone interacts with the control and interconnection system to receive information from at least one vehicle subsystem that measures fuel/energy level in the vehicle, and which operates as a communication interface to check current fuel/energy prices.

13. The method of claim 12, further comprising:
triggering a low fuel/energy warning based upon internal factors measured by the control and interconnection system, and external factors derived from the wireless cellular telephone.

14. The method of claim 1, further comprising:
accessing a wireless mobile device that is carried into the vehicle, to interconnect the data center to the control and interconnection system within the vehicle.

15. The method of claim 1 further comprising:
integrating into the control and interconnection system:
   a common set of features for use with multiple devices, including:
      a common data entry point;
      a common display screen; and
      a common set of control buttons;
      wherein the data entry point, display screen and set of control buttons enable accessing, controlling, and operating peripheral functionality and features for multiple, otherwise independent devices, to implement the travel related services;
   a vehicle supervisor that maintains appropriate flow, permissions, security and access to the common components; and
   at least one reconfigurable processing area of the control and interconnection system that is reserved or otherwise allocated for use by corresponding peripheral devices.

16. The method of claim 1 further comprising:
configuring the control and interconnection system, by a data representative at the data center, for implementing customized vehicle capabilities and feature sets by programming customization data, including appropriate operational parameters and/or other vehicle-related customization data, into the control and interconnection system.

17. The method of claim 16, wherein:
the control and interconnection system is implemented at least in part, by a portable wireless device; and
configuring the control and interconnection system is implemented by downloading the customization data into the portable wireless device, so that when the portable wireless device is suitably docked in the vehicle, the control and interconnection system supports the downloaded features of the customization data.

18. The method of claim 1 further comprising:
integrating into the control and interconnection system:
   a mission configuration control process that provides configuration data to peripherals associated with the control and interconnection system to oversee integrated operation or otherwise coordinate performance characteristics of various peripherals to carry out a mission associated with data received from the data center.

19. The method of claim 18 further comprising:
configuring the mission configuration control process to cooperate with a mode control monitor to dynamically modify vehicle configuration data during operation of the vehicle.

20. The method of claim 1, wherein:
receiving, from a data center, a set of travel related services that are specific to an individual, comprises:
   having a data representative provide vehicle technical assistance in order to generate the travel related services.

21. The method of claim 1 further comprising:
integrating into the control and interconnection system:
   a system security and diagnostics process that insures that the specific configuration requested by or required by the peripheral is authorized and configured to execute properly.

22. The method of claim 1 further comprising:
integrating into the control and interconnection system:
   a security and diagnostics processor that determines whether a configuration operates correctly based upon at least one of mission configuration settings identified by a mission configuration controller, configuration commands based upon driver settings, and alternate parameters provided by a control monitor.

23. The method of claim 1 further comprising:
storing at the data center, an adaptive template database that provides for updatable and changing templates of vehicle operator preferences, such that tracked and managed vehicle operator preferences are utilized to adjust the services that are received into the control and interconnection system associated with the vehicle.

24. The method of claim 1, wherein:
receiving, from a data center, a set of travel related services, comprises:
   receiving personal information that is not related to vehicle operation and control;
   receiving at least one vehicle-related parameter; and
   deriving the set of travel related services based upon the combination of the personal information and the at least one vehicle-related parameter.

* * * * *

UNITED STATES PATENT AND TRADEMARK OFFICE
CERTIFICATE OF CORRECTION

PATENT NO. : 9,824,383 B2
APPLICATION NO. : 14/582380
DATED : November 21, 2017
INVENTOR(S) : Joseph Gormley It is certified that error appears in the above-identified patent and that said Letters Patent is hereby corrected as shown below:

On the Title Page

Item [73], Assignee:
Line 1, "Livonis, MI" should read --Livonia, MI--.

Signed and Sealed this
Sixth Day of February, 2018

Joseph Matal
*Performing the Functions and Duties of the
Under Secretary of Commerce for Intellectual Property and
Director of the United States Patent and Trademark Office*